United States Patent [19]

McLeod et al.

[11] Patent Number: 5,550,899

[45] Date of Patent: Aug. 27, 1996

[54] LONG DISTANCE TELEPHONE SWITCHING SYSTEM WITH ENHANCED SUBSCRIBER SERVICES

[75] Inventors: Clark E. McLeod; Steven J. Hogan, both of Cedar Rapids; Kristi T. Feltz, Iowa City; Douglas R. Murdock, Cedar Rapids, all of Iowa; Van E. Hanson, Forest, Va.

[73] Assignee: MCI Communications Corporation, Washington, D.C.

[21] Appl. No.: 32,595

[22] Filed: Mar. 17, 1993

Related U.S. Application Data

[62] Division of Ser. No. 513,956, Apr. 23, 1990, Pat. No. 5,222,180.

[51] Int. Cl.[6] .............. H04M 3/50; H04M 3/54
[52] U.S. Cl. .............. 379/67; 379/84; 379/207; 379/211; 379/216
[58] Field of Search .............. 379/89, 88, 67, 379/201, 209, 211, 212, 210, 84, 207

[56] References Cited

U.S. PATENT DOCUMENTS

| | | | |
|---|---|---|---|
| 4,232,199 | 11/1980 | Boatwright et al. | 379/197 |
| 4,577,062 | 8/1986 | Hilleary et al. | 379/88 |
| 4,736,405 | 4/1988 | Akiyama | 379/89 |
| 4,752,951 | 6/1988 | Konneker | 379/211 |
| 4,766,604 | 8/1988 | Axberg | 379/84 |
| 4,847,890 | 7/1989 | Solomon et al. | 379/67 |
| 4,876,711 | 10/1989 | Curtin | 379/94 |
| 4,885,762 | 12/1989 | Suzuki et al. | 379/58 |
| 4,922,521 | 5/1990 | Krikke et al. | 379/95 |
| 4,926,462 | 5/1990 | Ladd et al. | 379/67 |
| 4,959,855 | 9/1990 | Daudelin | 379/213 |
| 5,012,511 | 4/1991 | Hanle et al. | 379/211 |
| 5,027,384 | 6/1991 | Morganstein | 379/67 |
| 5,058,152 | 10/1991 | Solomon et al. | 379/67 |
| 5,199,062 | 3/1993 | Von Meister et al. | 379/67 |
| 5,268,958 | 12/1993 | Nakano | 379/211 |

Primary Examiner—Thomas W. Brown

[57] ABSTRACT

A long distance telephone switching system is adapted to provide various enhanced subscriber services, such as an audio news and information service, conference calling, voice messaging, message storage and forwarding, and speed dialing, in addition to conventional long distance calling. Additional improvements include the use of prerecorded opening and closing scripts to facilitate the handling of operator-assisted calls, the retrieval of stored subscriber billing data prior to each call reorigination in order to detect instances of possible abuse, and the concatenation of subscriber-input authorization codes with access number data to allow the use of shorter authorization codes by the subscribers.

8 Claims, 26 Drawing Sheets

```
┌─────────────────────────────────────────────────┬──────────────────────────┐
│ MAY I HAVE THE NAME OF THE PARTY YOU ARE        │ 8/24 11:46  JDO  LIVE 0:22│
│ CALLING, PLEASE? [EXACT SPELLING REQUIRED]      ├────────┬────────┬────────┤
│ IS THIS A PERSON-TO-PERSON CALL?                │ ORIG.  │ TERM.  │        │
│ [YES-PRESS PER-PER KEY NO-PRESS ENTER KEY]      │CONNECTED│       │        │
│                         00000:07051             │        │        │        │
├─────────────────────────────────────────────────┤ ─RECV. >>>──TRANS. >>>─   │
│ DOMESTIC    TRANSFER *USA                       │                          │
│ CARD #      51234567890123                      │                          │
│                                                 │                          │
│                                                 │                          │
├─────────────────────────────────────────────────┤              ┌────┐      │
│                                                 │              │PER-│      │
│                                                 │              │PER │      │
└─────────────────────────────────────────────────┴──────────────┴────┴──────┘
```

FIG.16A

```
┌─────────────────────────────────────────────────┬──────────────────────────┐
│ THE NAME OF THE CITY CALLING PLEASE?            │ 8/24 7:36  JDO  LIVE 0:13│
│                                                 ├────────┬────────┬────────┤
│                                                 │ ORIG.  │ TERM.  │        │
│                                                 │CONNECTED│       │        │
│ CITY                    00000:07350             │        │        │        │
├─────────────────────────────────────────────────┤ ─RECV. >>>──TRANS. >>>─   │
│ DOMESTIC    TRANSFER *USA                       │                          │
│ CARD #      51234567890123                      │                          │
│                                                 │                          │
│             JOE DOE                             │                          │
│                                                 │ CALL DESTINATION    TIME │
├─────────────────────────────────────────────────┤              ┌────┐      │
│                                                 │              │PER-│      │
│                                                 │              │PER │      │
└─────────────────────────────────────────────────┴──────────────┴────┴──────┘
```

```
NAME OF THE STATE CALLING PLEASE?

STATE  ☐                      00000:07351
```

```
DOMESTIC     TRANSFER *USA
CARD #       51234567890123

DIR PERSON JOE DOE
```

```
8/24  7:36    JDO    LIVE 0:13

ORIG.   STATE
CONNE   ABBREVIATIONS
        AL.   AK.   AZ.
RECV.   AR.   CA.   CO.     >>>
        CT.   DC.   DE.
        FL.   GA.   HI.
        ID.   IL.   IN.
        IA.   KS.   KY.
        LA.   ME.   MD.
        MS.   MO.   NT.
        NE.   NV.   NH.
        NJ.   NM.   NY.
        NC.   ND.   OH.
        OK.   OR.   PA.
        RI.   SC.   SD.
        TN.   TX.   UT.
        VT.   VA.   WA.
        WV.   WI.   WY.
```

FIG.16D

```
THE NAME OF THE STATE CALLING PLEASE?           8/24  1:36    JDO    LIVE 0:13
                         MINNESOTA                TERM.
          ENTER THE AREA CODE : #
STATE ☐   BABBITT              MN ..... 618
          BACKUS               MN ..... 618       TRANS. >>>
          BADGER               MN ..... 618
DOMESTIC  TRANSF  BAGLEY       MN ..... 618
CARD #    512345  BALATON      MN ..... 507
                  BARNESVL     MN ..... 618
   DIR PERSON JOE DO  BARNUM   MN ..... 618
          BARRETT              MN ..... 612
          BATTLELAKE           MN ..... 218
          BAUDETTE             MN ..... 218
          BEAR RIVER           MN ..... 218
          BEARDSLEY            MN ..... 612
          BEAVER CRK           MN ..... 507
          PRESS DOWN FOR ANOTHER PAGE.
```

LONG DISTANCE TELEPHONE SWITCHING SYSTEM WITH ENHANCED SUBSCRIBER SERVICES

This application is a division of application Ser. No. 07/513,956, filed Apr. 23, 1990, now U.S. Pat. No. 5,222,120, and is related to application Ser. No. 08/032,594, filed the same day as the present application, now abandoned.

BACKGROUND OF THE INVENTION

The present invention relates generally to telephone switching systems, and is specifically concerned with a long distance switching system which is adapted to provide a number of enhanced subscriber services in addition to conventional long distance calling.

The restructuring of the U.S. telephone industry has made it possible for telephone subscribers to obtain long distance calling service from a variety of sources. In addition to exerting downward pressure on long distance rates, this has had the effect of encouraging long distance companies to offer subscribers additional service options that were not available previously. As an example, some long distance companies now offer subscribers the option of placing long distance calls from remote locations by dialing an access number (typically a toll-free 800 number), followed by an authorization code known only to the subscriber. Previously, subscribers wishing to place long distance calls from locations other than their own homes or businesses were required to seek operator assistance in order to make appropriate billing arrangements.

There are a number of additional types of services, such as conference calling, call forwarding, speed dialing, and message storage and forwarding, that would be attractive to many long distance telephone subscribers. To date, however, these services have usually been provided only in connection with private branch exchange (PBX) systems. In this type of system, the number of individual telephone stations involved is ordinarily small enough that enhanced services can be provided without a great deal of additional cost. In addition, since PBX systems are ordinarily not required to carry out billing or cost accounting functions (except in the case of outside calls), the problem of configuring the system in order to bill subscribers for these enhanced services on an itemized basis does not arise.

A number of attempts have been made to provide enhanced PBX-type services through a local telephone exchange serving an entire region or community. Generally, this has involved the installation of add-on equipment at the local exchange in order to provide the desired services to subscribers located in the region served by the exchange. The principal limitation of such systems, however, is that most of the enhanced services available to the subscriber (except for certain programming functions) can be accessed only from the subscriber's own telephone set. This is a result not only of the physical placement of the add-on equipment at the local telephone exchange, but also of the fact that the local exchange relies on the origination of the call on the subscriber's line to identify the subscriber for billing purposes.

In principle, it would be desirable to implement conference calling, call forwarding, speed dialing, message storage and forwarding, and other PBX-type services in a long distance switching environment. This would have the advantage of allowing these enhanced services to be accessed by subscribers located at any point within a wide geographic area. In practice, however, such an extension has not been feasible for at least two reasons. In the first place, the architecture of existing types of switching systems limits the amount and type of information which can be passed through the switch, a situation which makes it difficult to bill subscribers for enhanced services on an itemized basis. The second factor is the possibility that unauthorized callers may gain access to the long distance system, causing economic loss to the company operating the system and disruption to the subscriber. Unauthorized access is already a serious problem in conventional long distance calling, but the potential for abuse is obviously much greater when services other than long distance calling are available to the unauthorized user. The use of individual access codes known only to the subscribers can alleviate the problem to some extent, but this does not provide a complete solution since these codes may, in time, become known to others.

SUMMARY OF THE INVENTION

The present invention is directed to a telephone switching system which is adapted to provide subscriber-directed rerouting of incoming guest calls. The system comprises call switching means for receiving subscriber calls on a first incoming line and guest calls intended for a particular subscriber on a second incoming line reserved for that subscriber, call processing means coupled to the call switching means, and storage means coupled to the call processing means for storing a subscriber file containing a routing number to which guest calls for the subscriber are to be rerouted. The call processing means is operative to retrieve the subscriber file from the storage means when an incoming guest call is received on the second incoming line, and to cause the call switching means to complete the guest call using the routing number contained in the subscriber file. The call processing means is further operative to retrieve the subscriber file from the storage means, and to modify the routing number, in response to request codes entered by subscribers calling on the first incoming line. The routing number may be such as to direct the incoming call to another telephone accessible by the switching system or to a voice messaging system accessible to the subscriber, depending on the request code entered.

BRIEF DESCRIPTION OF THE DRAWINGS

The various objects, advantages and novel features of the invention will be more readily apparent from the following detailed description when read in connection with the appended drawings, in which:

FIG. 16, consisting of FIGS. 16A, 16B, 16C and 16D, illustrates certain screen displays which are generated at the manual operator console to facilitate the enhanced directory assistance service;

Throughout the drawings, the use of like reference numerals should be understood to refer to like parts and components.

DETAILED DESCRIPTION OF THE PREFERRED EMBODIMENT

General Description

Figure 1:
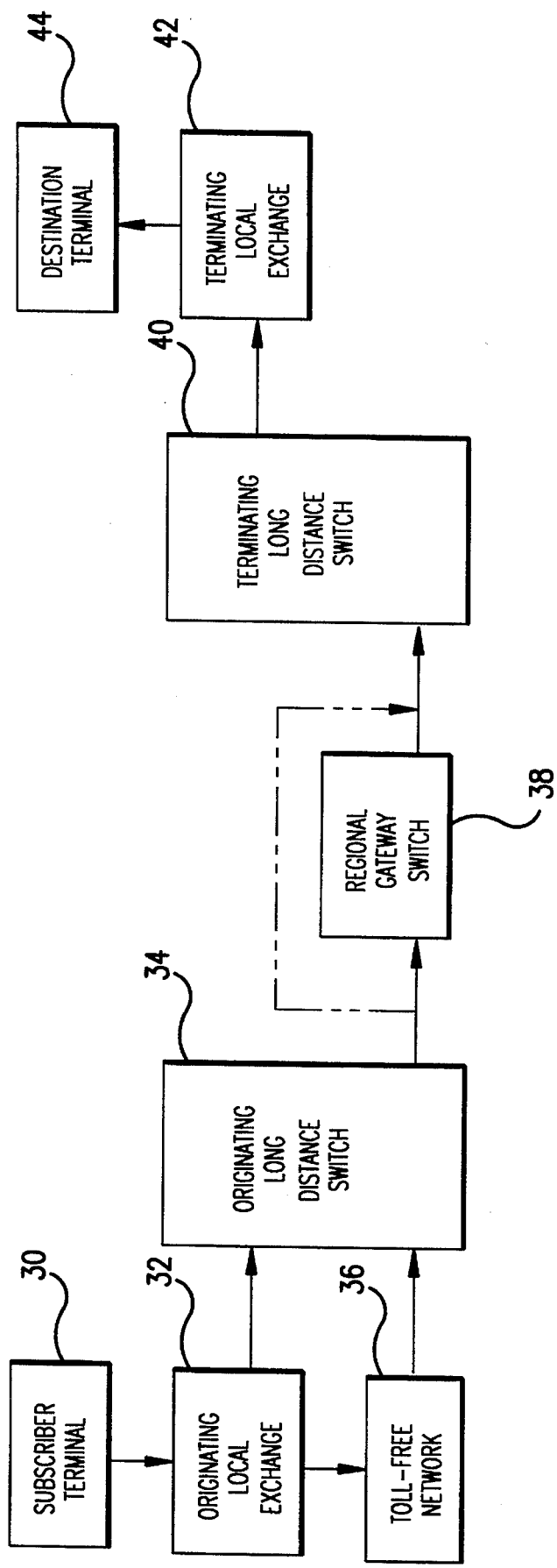
FIG. 1 is a block diagram of a long distance switching system in which the present invention may be utilized.

FIG. 1 is a block diagram of a long distance telephone system in which the present invention may be advantageously employed. A long distance call is originated at a subscriber terminal 30, which will typically consist of a conventional telephone set but may also include a computer terminal, modem, facsimile machine, or the like. The call is routed to a local telephone exchange 32, which contains translation and switching equipment for detecting the called number and routing the call to the appropriate outgoing line. In some instances, as in the case where the call is being placed from the subscriber's own home, the call is routed on an outgoing trunk line which leads directly to a long distance switching office 34 operated by the company chosen by the subscriber to provide long distance telephone service. In other instances, including those in which the subscriber is calling from a pay telephone station or from some other remote location, the subscriber may dial an access number which causes the local exchange 32 to route the call to the subscriber's long distance switching office 34 through a toll-free (800) network 36. The distinction between these two types of calls will be explained in more detail hereinafter.

At the long distance switching office 34, the incoming call is analyzed to determine the identity of the calling subscriber, the type of call being made, and the status of the subscriber's account. The call is then transferred to an outgoing trunk line, and billing records are generated which are temporarily stored and then used at a later time to generate a bill for the subscriber. From the switching office 34, the call is routed to a second long distance switching office 40 in a different geographic area, either directly or through a regional gateway switching office 38. The switching office 40 then transfers the call to the appropriate local exchange 42, which in turn routes the call to a destination terminal 44 corresponding to the number called by the subscriber. As in the case of the subscriber terminal 30, the destination terminal 44 will typically consist of a standard telephone set, but may also include computer or facsimile equipment.

In accordance with the present invention, certain enhanced services previously available to a telephone subscriber only through the local exchange 32, such as conference calling, call forwarding, speed dialing, and message store-and-forward services, can now be provided through the central long distance switching office 34. This makes it possible for the subscriber to access these services from remote telephone stations located at any point within a wide geographic area. Other types of services, such as audio news and information services, voice messaging, and various types of operator-assisted services, can also be provided to the subscriber in a similar manner. Because all of these services are made available to the subscriber through a single long distance switching office 34, they can be accessed by means of a single telephone call and presented to the subscriber in audible menu form. Billing procedures are also simplified, since the long distance switching office 34 can generate a single bill to the subscriber listing the charges incurred for each of the enhanced services, in addition to the usual charges for domestic and international telephone calls.

In addition to providing various types of enhanced subscriber services, the present invention is also directed to certain improvements in the manner in which conventional types of subscriber calls are handled at the long distance switching office 34. These improvements include the use of pre-recorded opening and closing scripts to facilitate the handling of operator-assisted calls, the retrieval of stored subscriber billing data prior to each call reorigination in order to detect instances of possible abuse, and the concatenation of subscriber-input authorization codes with access number data to allow the use of shorter authorization codes by the subscribers. These aspects of the invention will be discussed in more detail in the description which follows.

Long Distance Switching Office

Figure 2:
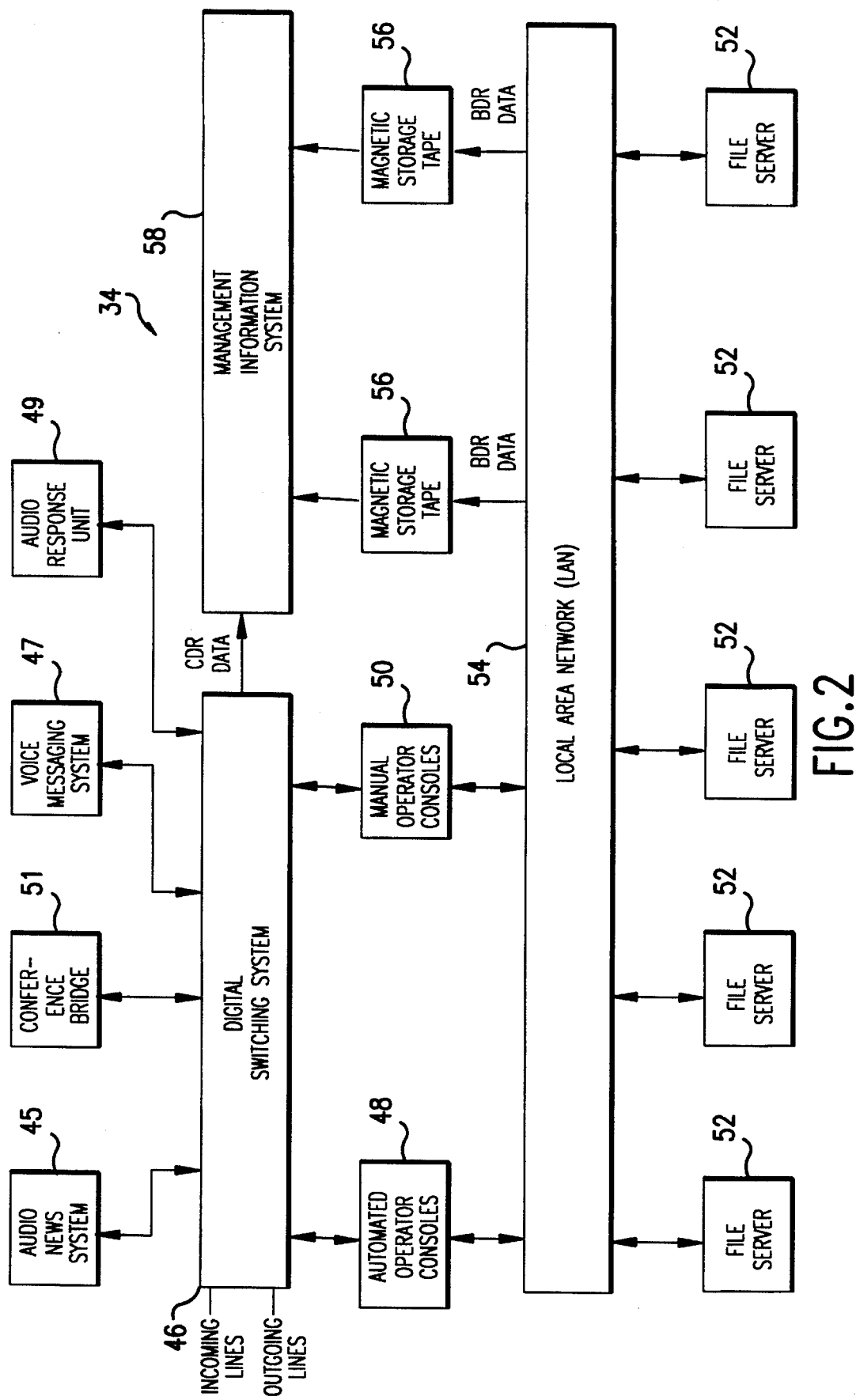
FIG. 2 is a block diagram illustrating the principal components of the long distance switching office of FIG. 1.

The principal components of the long-distance switching office 34 of FIG. 1 are illustrated in block form in FIG. 2.

The incoming and outgoing trunk lines are connected to a digital switching system 46, which may be of a commercially available type such as the X08-26.0 series digital switch manufactured by DSC Communications Corporation of Plano, Tex. Associated with the digital switching system 46, either at the switching office 34 or at another location, are an audio news and information system 45, a voice messaging system 47, an audio response unit 49 and a conference bridge 51, the functions of which will be discussed in detail hereinafter. Incoming calls received by the digital switching system 46 are transferred on an individual basis to a number of automated operated consoles 48 and manual operator consoles 50. The function of the operator consoles is to analyze each incoming call in order to determine the type of call being made, and, in the event that a request is being made for one of the enhanced subscriber services described previously, to initiate the desired service. The operator consoles also retrieve subscriber files from storage in order to determine whether the requested call or service is authorized, and create a billing detail record (BDR) for each call in order to allow itemized bills to be sent to the subscribers. Once initial processing of the call is complete, the console releases the call and control is returned to the digital switching system 46 for the duration of the call.

The operator consoles 48, 50 may be implemented as personal computer terminals, and are provided with suitable software programming and hardware interfaces for exchanging digital and audio signals with the switching system 46. Software programs of the required type, which are known as operator service systems (OSS), are available from manufacturers of commercially available types of digital switching systems. The automated consoles 48 and manual consoles 50 are substantially similar to each other in construction, except that the automated consoles are programmed to handle incoming calls automatically while the manual consoles are programmed to respond to keyboard inputs entered by a human operator. These inputs will ordinarily be entered while the operator is conversing with the calling or called party. Normally, the digital switching system 46 is programmed to initially route all incoming calls to the automated consoles 48, unless all of the automated consoles are busy. In the latter situation, or in the case where the subscriber has requested a service or call type requiring human operator assistance, control over the incoming call is passed from the automated console to one of the manual consoles 50.

In practical applications, approximately 40 automated consoles and 80 manual consoles may be employed, the total number being limited by the capacity of the digital switching system 46 and the limits of the OSS software. The switching system 46 communicates with the automated consoles 48 on a pooled basis, and automatic log-in procedures are used to indicate to the switching system 46 the particular consoles which are operating at any given time. The manual consoles 50 are handled in a similar manner, except that the required log-ins are entered manually by the human operators through the use of the console keyboard.

With further reference to FIG. 2, the automated and manual consoles 48, 50 communicate with a number of file servers 52 by means of a local area network (LAN) 54. The file servers 52, all of which are essentially identical, contain OSS software programs, subscriber files, and billing detail records (BDRs) which are periodically retrieved by the consoles 48, 50 in order to allow individual calls to be processed. The LAN allows communication to take place among the various consoles 48, 50 and file servers 52 on a time-division basis. The Ethernet system developed by Xerox Corporation of Rochester, N.Y. is an example of a suitable LAN which may be used for this purpose. In the Ethernet system, the devices requiring communication with each other are connected to a shared cable by means of transceivers, and data is exchanged in packets containing the addresses of the sending and receiving units. Other types of local area networks can also be used in the practice of the present invention.

Also connected to the LAN 54 are a number of data storage units 56, which preferably comprise magnetic tape drives. The function of the units 56 is to provide off-line storage for BDR data generated by the automated and manual consoles 48, 50, and to transfer this data to a management information system (MIS) 58. The MIS 58 correlates BDR data obtained from the storage units 56 with call detail record (CDR) data produced automatically by the digital switching system 46, and uses this information to generate printed bills which are periodically sent to the subscribers. In a preferred implementation, the MIS 58 comprises a large mainframe computer such as the Model 3090 system manufactured by International Business Machines Corporation of Armonk, N.Y.

Digital Switching System Components

Figure 3:
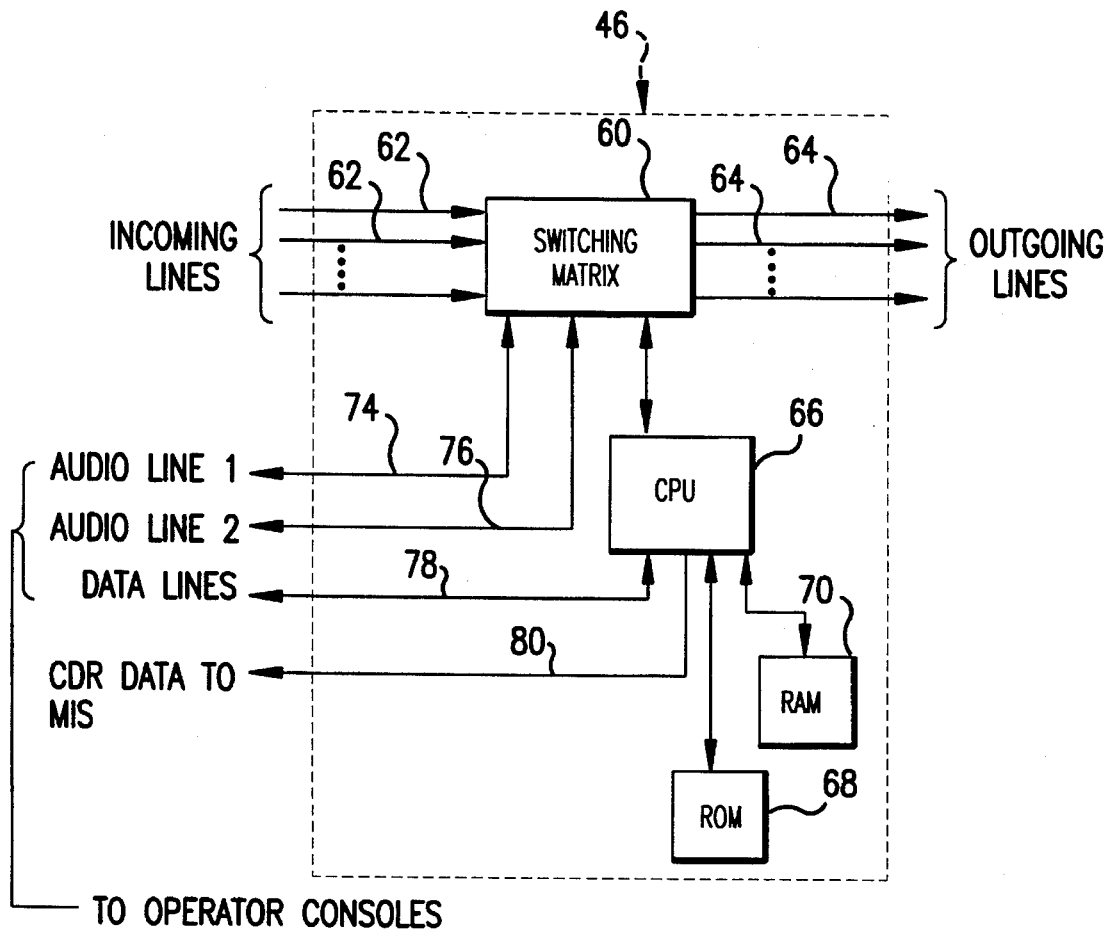
FIG. 3 is a detailed block diagram of the digital switching system included in the long distance switching office of FIG. 2.

FIG. 3 is a more detailed block diagram of the digital switching system 46. The primary component of this system is a switching matrix 60, which establishes connections between incoming and outgoing lines 62, 64 in order to process incoming calls or service requests. The incoming and outgoing lines 62, 64 will typically include local exchange lines, toll-free (800) service lines, T-carrier trunks, and tie trunks. These lines carry incoming calls from subscribers and non-subscribers (e.g., guests seeking access to subscriber voice messaging systems) and also carry signals needed to support features such as automatic number identification (ANI), which identifies the telephone number of the calling party.

The operation of the switching matrix 60 in FIG. 3 is controlled by a central processing unit (CPU) 66, which is in turn controlled by software programs stored in a read-only memory (ROM) 68. The CPU is also connected to a random access memory (RAM) 70, which provides temporary storage of system performance data and CDR data generated during call processing. The switching matrix 60 and CPU 66 provide a number of outputs to the operator consoles 48, 50 and MIS 58 of FIG. 2. The operator consoles each receive two four-wire audio lines 74, 76 from the switching matrix 60, and data lines 78 from the CPU 66. The data lines 78 allow digital control information to be passed between the CPU 66 and the consoles 48, 50. The audio lines 74, 76 allow the automated and manual consoles to exchange voice and tone signals with the subscriber during the initial portion of each incoming call. Although a single transmit-and-receive audio line would be sufficient for this purpose, the use of two audio lines, as shown, allows an automated or manual console to place an outgoing call for a subscriber while the subscriber is held on an incoming line. This capability is required for voice message access, conference calling, and certain other services as will be described in more detail below.

It will be understood that the audio and data lines 74–78 of FIG. 3 are duplicated for each of the automated and manual consoles 48, 50. The switching matrix 60 and CPU 66 include suitable gating logic for directing audio and digital signals associated with incoming calls to specific consoles 48, 50, either on a random basis or in accordance with a predetermined pattern or schedule that assures a relatively even distribution of calls among the various consoles.

The CPU 66 also provides certain outputs to the MIS 58 of FIG. 2 on line 80. These outputs consist primarily of call detail record (CDR) data, but may also include system performance data that can be monitored by supervisory personnel and/or used to generate printed reports. A CDR is produced automatically by the CPU 66 during the processing of each call, and contains certain key information that is used, together with the BDR data referred to previously, to produce a bill for the subscriber. The specific format of the CDR will vary according to the particular type of digital switching system 46 employed, but will typically consist of a series of reserved fields of different lengths in which certain types of call process data may be inserted. Such data may include, for example, the telephone number of the calling party (obtained from the incoming ANI data), the telephone number to which the call is being placed, various time points representing the progress of the call between origination and disconnection, and a unique sequence number identifying the CDR for later retrieval. Some of this information, such as the ANI data and the called number, is obtained directly from the incoming lines 62. Other information, including the various time points, is generated automatically by the switching matrix 60 or CPU 66 during call processing. Still other information, such as the sequence number, is obtained from the operator consoles 48, 50 during the initial portion of each incoming call.

Operator Consoles

Figure 4:
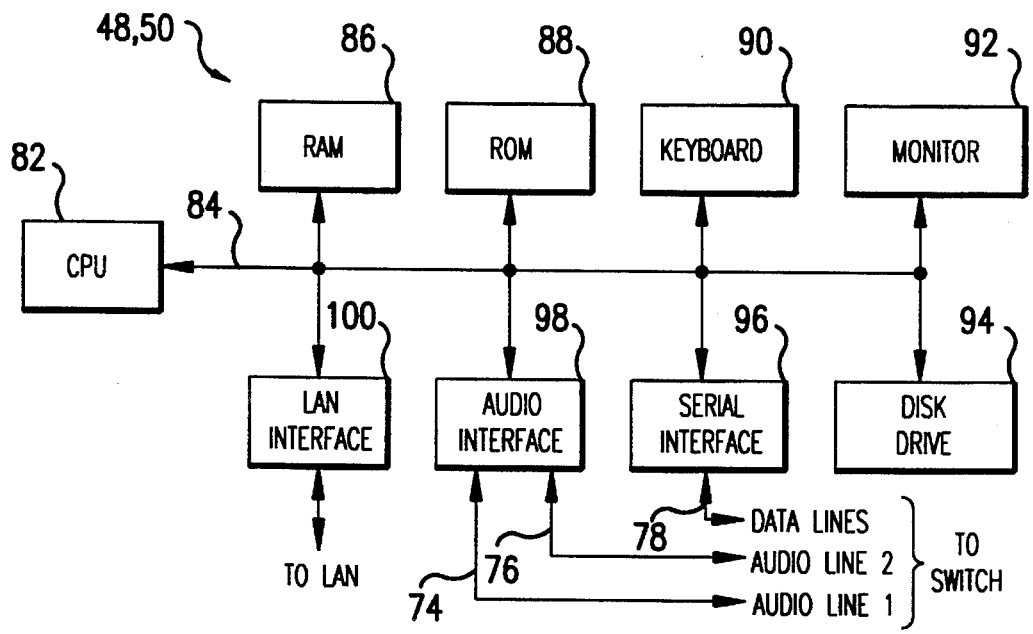
FIG. 4 illustrates the components of the automated and manual operator consoles used in the long distance switching office of FIG. 2.

FIG. 4 illustrates the components of one of the automated or manual operator consoles 48, 50 of FIG. 2. As noted previously, the automated and manual consoles are substantially identical to each other, except insofar as their internal programming is concerned. There are, however, minor hardware differences between the two types of consoles, as will be explained hereinafter.

In the preferred embodiment, the operator consoles 48, 50 comprise personal computer terminals which are modified with suitable programming and hardware interfaces to perform the functions required by the present invention. By way of example, the operator consoles may be based on IBM PC-AT personal computers manufactured by International Business Machines Corporation of Armonk, N.Y., or equivalent machines produced by other manufacturers. The operation of the console is controlled by a central processing unit 82, which is connected to each of the remaining components by means of a bidirectional data, address and control bus 84. A random-access memory (RAM) 86 stores OSS software and other information obtained from the file servers 52, and also provides working memory for the console. A read-only memory (ROM) 88 stores various programs needed for input-output, power-up, self-test, and booting procedures. A keyboard 90 is provided to allow manual commands to be entered by a human operator, in the case of a manual console, or to allow initialization and diagnostic operations to be carried out on an automated console. The console also includes a video monitor 92 for displaying call processing information, and a disk drive unit 94 for loading operating system software into the console using standard 5.25-inch magnetic diskettes. In the case of a manual console, the video monitor 92 displays stored operator scripts, subscriber account information, and other information that facilitates manual handling of incoming calls. Similar information is displayed by the video monitors 92 of an automated console, in order to allow the operation of the console to be monitored from time to time. Since such monitoring will ordinarily be relatively infrequent, a single monitor 92 can be shared by a number of automated operator consoles 48 by means of a selector switch (not shown).

In order to allow the operator consoles to send and receive digital data from the digital switching system 46 of FIG. 3, an RS-232 serial interface 96 is connected to the bus 84. The serial interface communicates with the CPU 66 of the digital switching system 46 by means of the data lines 78 described previously. Audio communication between the operator console and the digital switching system 46 is made possible by an audio interface 98, to which the audio lines 74, 76 of FIG. 3 are connected. The audio interface 98, which may consist of one or more plug-in circuit cards occupying slots in the personal computer terminal serving as the operator console, as will be described in more detail in connection with FIG. 7. In addition to the serial and audio interfaces 96, 98, the operator console includes a LAN interface 100 which serves to connect the console to the local area network 54 of FIG. 2. The LAN interface may consist of a plug-in card, although its specific construction and operation will depend upon the nature of the LAN employed. In the case of the Ethernet LAN described previously, the LAN interface 100 will consist of a transceiver which allows data to be transferred between the operator console and the shared cable to which the remaining consoles 48, 50 and file servers 52 of FIG. 2 are connected.

File Servers

Figure 5:
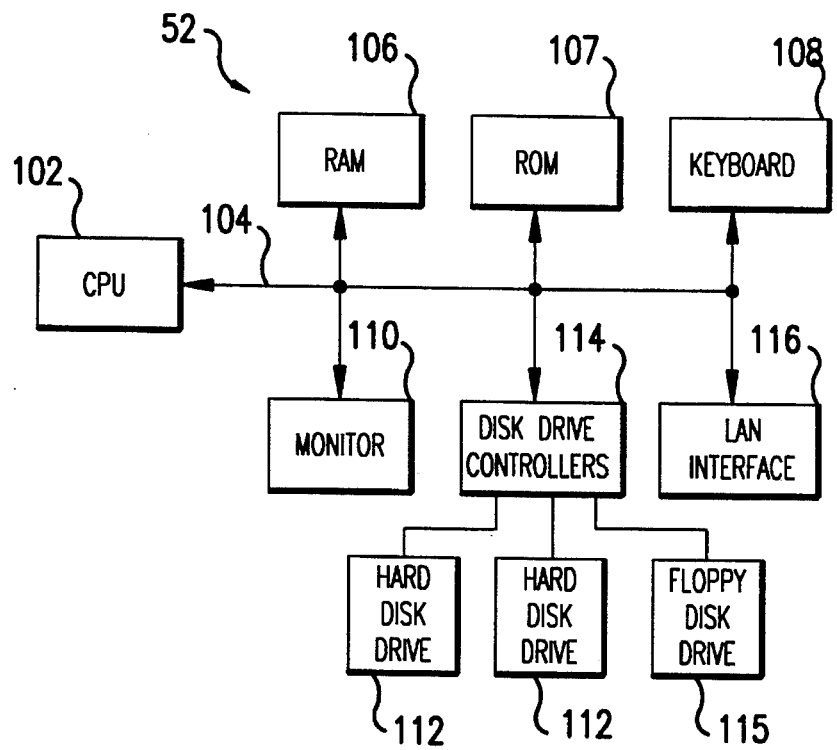
FIG. 5 is a block diagram of a file server used in the long distance switching office of FIG. 2.

The file servers 52 of FIG. 2 provide high-capacity storage for various types of data and programming used or generated during call processing, including the OSS software used by the automated and manual consoles 48, 50, individual subscriber files identifying authorized call types and service options, and BDR data generated by the automated and manual consoles during call processing. A block diagram of one of the file servers 52 is provided in FIG. 5.

As in the case of the operator consoles 48, 50, the file server 52 may be based on a commercially available type of personal computer terminal, such as the Model 325 personal computer manufactured by Dell Computer Corporation of Austin, Tex. The file server is controlled by a central processing unit (CPU) 102, which communicates with the remaining components by means of a bidirectional bus 104. A random access memory (RAM) 106 provides working storage for the CPU 102, and also stores the operating system software used to control the file server. A read-only memory (ROM) 107 stores the programming needed to load the operating system software into the RAM 106. A keyboard 108 and video monitor 110 are provided to allow supervisory personnel to carry out various initialization and diagnostic procedures. As in the case of the automated operator consoles, a single monitor 110 can be shared among a number of file servers 52 by means of a selector switch (not shown).

The mass storage function of the file server 52 is accomplished by means of a number of hard disk drives 112, which are connected to the bidirectional bus 104 by means of a disk drive controller 114. A floppy disk drive 115 is also provided in order to load operating system software into the hard disk drives 114. A LAN interface 116, similar to that employed in the operator console of FIG. 4, is connected to the bus 104 in order to allow information to be transferred to and from the file server 52 through the local area network 54 of FIG. 2. This information will generally consist of OSS programming that is loaded as needed into the automated and manual consoles 48, 50, individual subscriber files requested by the operator consoles when incoming calls are received, and BDR data generated or retrieved by the operator consoles. The OSS programming is usually loaded into the operator consoles only once, during initial power-up, and is stored in the console RAM so that it is immediately available for use during call processing.

Management Information System

Figure 6:
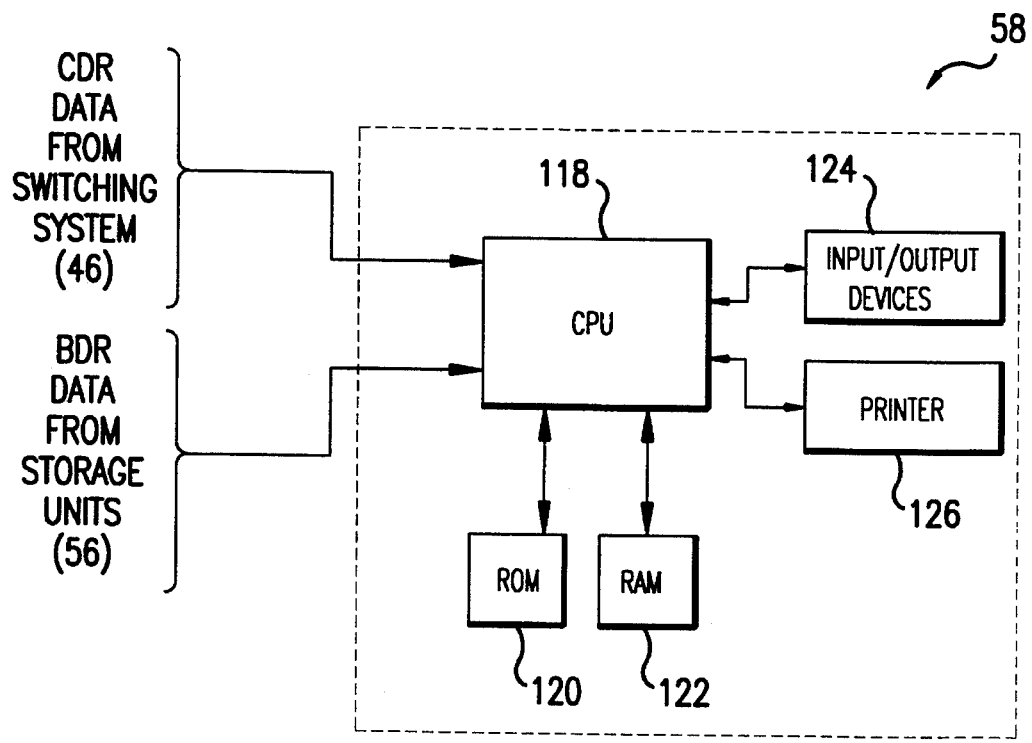
FIG. 6 is a block diagram of the management information system shown in FIG. 2.

A block diagram of the management information system (MIS) 58 of FIG. 2 is provided in FIG. 6. The MIS 58 is controlled by a central processing unit (CPU) 118 which is, in turn, controlled by billing program software stored in a read-only memory (ROM) 120. Various programs needed for information and data input/output, power-up and self-testing are also stored in the ROM. The CPU is also connected to a random access memory (RAM) 122, which provides temporary storage of OSS software, as well as billing information such as CDR data obtained from the digital switching system 46 and BDR data obtained from the data storage units 56. As noted previously, the BDR data is initially stored in the file server 52 and is transferred to the magnetic tape at the storage units 56 through the LAN interface 54. Information and data can be exchanged between the CPU and one or more input/output devices 124 such as operator terminals. The terminals 124 include a keyboard for the entry of manual commands and data from a human operator, as well as a video monitor for displaying billing processing information. A printer 126 is provided to render hard copy subscriber account statements obtained from data processed by the CPU 118.

Audio Interface

Figure 7:
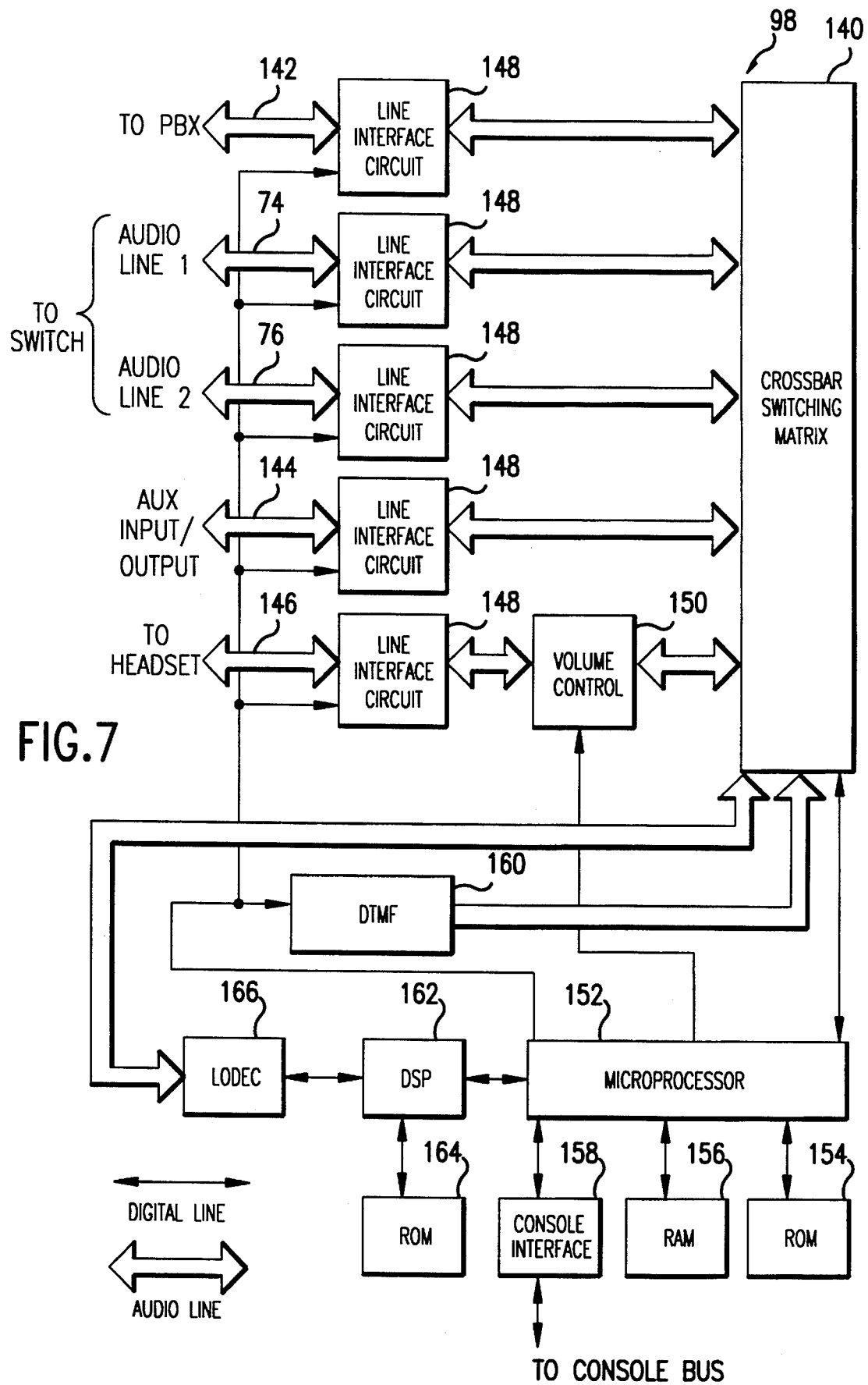
FIG. 7 is a block diagram of the audio interface used in the operator console of FIG. 4.

FIG. 7 is a block diagram of the audio interface 98 shown generally in FIG. 4. As noted previously, the audio interface 98 preferably comprises one or more plug-in circuit cards which are inserted into slots in the personal computer terminals serving as the automated and manual operator consoles 48, 50. There are slight differences in hardware between the audio interfaces used in the automated consoles 48 and those used in the manual consoles 50, and these differences will be explained hereinafter.

With particular reference to FIG. 7, the audio interface 98 includes a crossbar switching matrix 140 which establishes connections among the audio lines connecting the operator console to other equipment. Included among these lines are the audio lines 74, 76 which connect the operator console to the switching matrix 60 of FIG. 3. As noted previously, one of these audio lines allows tone and voice signals to be exchanged between the operator console and a calling subscriber, and the other allows the operator console to place an outgoing call while the subscriber is held on an incoming line. A third audio line 142 is provided in order to connect the operator console to a local private branch exchange (PBX). The local PBX allows supervisory personnel to monitor conversations which are taking place between the operator consoles and outside callers, primarily for the purpose of evaluating the performance of the human operators stationed at the manual consoles 50. This audio line may be omitted in the case of an automated console, or may simply be left unconnected. A fourth audio line 144 is provided in order to allow certain types of auxiliary inputs to be connected to the operator console, such as pre-recorded musical programs or spoken messages. This pre-recorded material may be used to provide entertainment, advertising or informative messages to a caller during periods when it is necessary for the operator console to place the caller's line on hold. The audio line 144 also provides an auxiliary output from the operator console which may, for example, be used to allow tape recording of incoming calls for billing verification or in emergency situations. A fifth audio line 146 is provided in order to allow a headset (not shown) to the operator console. This audio line is principally for use by the human operators stationed at the manual consoles 50, and may be omitted or left unconnected in the case of the automated consoles 48.

Each of the audio lines 74, 76 and 142–146 is connected to the crossbar switching matrix 140 through a separate line interface circuit 148. This circuit contains audio transformers and other equipment necessary to provide isolation and impedance matching between the operator console and the particular item of external equipment to which the audio line is connected. In the case of the headset audio line 146, a volume control unit 150 is connected between the line interface circuit 148 and the crossbar switching matrix 140 in order to allow the human operator to adjust the headset volume by entering appropriate commands through the manual console keyboard.

With further reference to FIG. 7, the operation of the crossbar switching matrix 140 is controlled by a microprocessor 152 in response to programming stored in a read-only memory (ROM) 154. A random access memory (RAM) 156 provides working storage for the microprocessor 152, and an interface circuit 158 connects the microprocessor 152 to the console data bus 84 of FIG. 4. Through this interface, the microprocessor 152 receives commands and other information from the console CPU 82 of the FIG. 4, and vice-versa. Additional outputs from the microprocessor 152 are used to control the volume control unit 150 and a dual-tone multi-frequency (DTMF) unit 160. The DTMF unit 160 provides the operator console with the tone generation functions needed to place outgoing calls and to operate certain types of tone-controlled external equipment, such as the audio news and information system 45, voice messaging system 47, and audio response unit 49 of FIG. 2. Also connected to the microprocessor 152 is a digital signal processor (DSP) 162, which allows the microprocessor to detect and process dial tone signals, disconnect signals, voice signals and other types of incoming audio signals which may appear on the audio lines 74, 76 leading to the switching matrix 140. The DSP 162 also generates certain types of audio signals, including digitized voice messages and tone prompts, which are applied to the audio lines 74, 76 when needed in order to handle an incoming call. The DSP 162 operates digitally in accordance with programming stored in a read-only memory (ROM) 164. A coder-decoder (codec) unit 166 performs analog-to-digital conversion on the audio signals received by the DSP 162 from the switching matrix 140, and also performs digital-to-analog conversion on output signals from the DSP 162 that are applied to the switching matrix 140.

When an incoming call is received by an automated console 48, the microprocessor 152 of the audio interface 98 exchanges commands and data with the console microprocessor 82 of FIG. 4 in order to process the call in accordance with the OSS stored in the console RAM 86. Initially, this will involve the playback of stored audio messages and/or prompt tones to the subscriber in order to advise the subscriber of the various calling options and services that are available. This is done by means of the DSP 162 and codec 166, which are connected during this time to the incoming audio line 74 or 76 by means of the switching matrix 140. When the subscriber selects a desired service or calling option, the DTMF tones originating from the subscriber's telephone set are detected by the codec 166 and DSP 162. This will initiate such further action by the audio interface microprocessor 152 and by the console CPU 82 as may be required to complete the call or initiate the desired service. During this time, the operator console also generates a billing detail record (BDR), as will be described in more detail below.

The functions performed by the audio interface 98 of FIG. 7 in the case of a manual operator console 50 are similar in most respects to those described above. However, the switching matrix 140 of a manual console 50 will also operate to connect the headset line 146 to one or both of the audio lines 74, 76 at various times during the processing of a call. This allows the human operator to converse with the subscriber in order to obtain any necessary instructions or information, and also allows the operator to converse with third parties to whom calls may be placed at the request of the subscriber (e.g., during collect or person-to-person calling). In the case of a manual console, the audio interface 98 will ordinarily not be called upon to produce digitized voice messages or to interpret tone signals received from the user, since most of the necessary information will be exchanged verbally. Appropriate commands for implementing the subscriber's requests are entered by the human operator using the keyboard 90 of FIG. 4, and these commands are converted by the OSS software into instructions for causing the audio interface processor 152 to carry out the desired functions.

Some commercially available types of digital switching systems require that the audio lines 74, 76 be disconnected from any external equipment at certain points during the processing of a call. To accommodate this requirement, the audio interface of FIG. 7 is configured to allow the microprocessor 152 to control isolation switches (not shown) within the line interface circuits 148. To this end, output lines are provided from the microprocessor 152 to the line interface circuits 148. It may be desired to provide this function for all of the line interface circuits 148, as shown, rather than only for those associated with the audio lines 74, 76 leading to the digital switching system 46 of FIG. 4. By controlling the headset line 146, for example, the microprocessor 152 can activate the headset of a human operator only at those points during the handling of a call when it is necessary for the operator to speak to the subscriber, or vice-versa.

Billing Detail Record Format

As described previously in connection with FIG. 2, the automated and manual operator consoles 48, 50 generate a billing detail record (BDR) for each incoming call received by the long distance switching office. The BDR data is stored temporarily in the file servers 52, and is then placed into off-line storage in the magnetic tape units 56. The stored BDR data is periodically transferred from the magnetic tape units 56 to the management information system (MIS) 58, where it is used in combination with stored call detail record (CDR) data provided by the digital switching system 46 in order to generate subscriber bills. The need for the BDR arises from the fact that the amount and type of billing information which can be carried in the CDR is inherently limited by the architecture of commercially available types of digital switching systems 46. The use of the BDR avoids this limitation by providing additional data fields which can be used to record the subscriber's requests for specialized call types and service options not contemplated by the designer of the switching system, so that the subscriber can be billed for these calls and services on an itemized basis. In order to accomplish this, however, each CDR received by the MIS 58 must be matched or correlated with a BDR generated from the same incoming call. The manner in which this matching function is accomplished will be described shortly.

In the preferred embodiment of the present invention, the BDR is a 240-byte record with reserved fields of different lengths. These fields are identified in Table 1 below:

TABLE I

| Billing Detail Record Format | | |
|---|---|---|
| Bytes | Code | Function |
| 0–1 | AO | Accounting office identification |
| 2–8 | CI | Sequence number (call identifier) |
| 9–14 | RD | BDR record date |
| 15–20 | RT | BDR record time |
| 21–23 | OP | Operator console position |
| 24–28 | OI | Operator identification (manual console) |
| 29–40 | — | Reserved field |
| 41–44 | TS | Call termination status |
| 45–48 | VS | Call validation status |
| 49–52 | RS | Reorigination status counter |
| 53–55 | SN | Digital switching site |
| 56–58 | LT | Local time offset |
| 59–68 | ON | Originating telephone number (from ANI data) |
| 69–84 | TN | Terminating telephone number |
| 85–87 | CT | Call type (direct dial, operator-assisted, etc.) |
| 88–91 | BT | Billing type (collect, credit card, etc.) |
| 92–97 | RP | Rate plan for billing |
| 98–100 | CS | Surcharge rate (if any) per call |
| 101–103 | MS | Surcharge rate (if any) per minute |
| 104–106 | OS | Operator surcharge (if any) per call |
| 107–109 | FT | Foreign tax rate |
| 110–133 | BN | Billing number (e.g., credit card number) |
| 134–136 | TT | Operator treatment time (in seconds) |
| 137–141 | R1 | Miscellaneous use revenue field (for coin calls) |
| 142–146 | R2 | Miscellaneous use revenue field (for coin calls) |
| 147–162 | M1 | Miscellaneous information field (e.g., caller's name for collect calls) |
| 163–178 | M2 | Miscellaneous information field (e.g., name of called party for person-to-person calls) |
| 179–180 | AR | Special billing action required |
| 181–182 | MT | Method of call termination |
| 183–198 | SR | Statistical reporting of operator data entry errors |
| 199–205 | CN | Customer account number |
| 206–221 | M3 | Miscellaneous information |

TABLE I-continued

Billing Detail Record Format

| Bytes | Code | Function |
|-------|------|----------|
|       |      | field (e.g., name of called party for person-to-person calls billed to third party) |
| 222–239 | — | Reserved fields for trouble codes and credit calls |

The sequence number or call identifier (CI) in bytes 2–8 of the billing detail record is a unique number that is generated automatically by the operator console when an incoming call is received. In order to allow a given BDR to be matched with the corresponding CDR for billing purposes, the sequence number CI is concatenated with the SN, OP and AO fields of the billing detail record by the operator console. The resulting quantity, referred to as an alternate call identifier (ACI), is inserted by the operator console into the CDR field reserved for the billing number. (This latter field is unnecessary in the CDR since it is already provided in the BDR.) During the billing process, the MIS 58 of FIG. 2 is able to link each CDR to a corresponding BDR by matching the information contained in the billing number field of the CDR with the information contained in the corresponding fields of the BDR. In order to confirm the match, the MIS checks to determine whether the called number field in the CDR contains the same information as the terminating number (TN) field of the BDR.

The call type (CT) field of the billing data record specifies the particular type of call or service that has been requested by the subscriber. Possible call types include, for example, conventional direct-dialed long distance calls (domestic and international), operator-assisted long distance calls, and person-to-person calls. Possible types of services which may be requested by the subscriber include long distance calls placed from remote telephone stations, audio news and information services, conference calling, voice messaging services, message storage and forwarding services, subscriber-directed call rerouting, and speed dialing. The subscriber may also request various types of operator-assisted services, including travel-related services and enhanced directory assistance services. The manner in which these services are requested by the subscriber and implemented at the long distance switching office will be described in some detail hereinafter.

In order to utilize one or more of the enhanced services listed above, the subscribers are assigned special access numbers (preferably toll-free 800 numbers) which they may dial in order to reach the long distance switching office 34 of FIG. 1. When a subscriber call is placed using one of these access numbers, the subscriber is prompted by a tone signal to enter a unique authorization code previously assigned to that particular subscriber. This authorization code is sometimes referred to hereinafter as a "card number", since it will typically appear on an identification card issued to the subscriber. This authorization code may be in the usual 14-digit format, but may be reduced to 7 digits by using the last 7 digits of the subscriber-dialed access number to provide the remaining digits of the authorization code. In either case, the authorization code serves as a key in order to allow the operator console to obtain a subscriber file from the file servers 52 of FIG. 2. The subscriber file provides certain billing and identification information that is needed in order to generate a BDR, and also indicates the particular call types and service options that the subscriber is authorized to select. A preferred format for the subscriber file is illustrated in Table II below:

TABLE II

| Field Size | Field Description |
|------------|-------------------|
| 1 digit | Account code length |
| 3 digits | Account code plan (refers to file containing list of approved account codes) |
| 25 digits | Subscriber name |
| 25 digits | Business name |
| 10 digits | Customer ANI (telephone number of customer's billing address) |
| 10 digits | Customer 800 number for subscriber-directed call rerouting |
| 3 digits | Accounting office (destination of CDR and BDR) |
| 3 digits | Guest access routing code |
| 8 digits | Virtual network authorization code |
| 16 digits | Speed dial number 1 |
| 16 digits | Speed dial number 2 |
| 16 digits | Speed dial number 3 |
| 16 digits | Speed dial number 4 |
| 16 digits | Speed dial number 5 |
| 16 digits | Speed dial number 6 |
| 16 digits | Speed dial number 7 |
| 16 digits | Speed dial number 8 |
| 16 digits | Speed dial number 9 |
| 1–3 digits | Voice messaging type (identifies subscriber's voice messaging hardware) |
| 10 digits | Voice messaging routing number (dialed by operator console) |
| 1 digit | Voice messaging user delay (pause interval, in seconds) |
| 1 digit | Voice messaging user function (dial tone or voice activation) |
| 12 digits | Voice messaging user dial string (identifies subscriber's mailbox) |
| 10 digits | Voice messaging guest routing number (dialed by operator console) |
| 1 digit | Voice messaging guest delay (pause interval, in seconds) |
| 1 digit | Voice messaging guest function (dial tone or voice activation) |
| 12 digits | Voice messaging guest dial string (identifies subscriber's mailbox) |
| Yes/No | Domestic direct dial option available? |
| Yes/No | International direct dial option available? |
| Yes/No | Domestic operator-assistance option available? |
| Yes/No | International operator-assistance option available? |
| Yes/No | Enhanced directory assistance service available? |
| Yes/No | Standard directory assistance service available? |

TABLE II-continued

| Field Size | Field Description |
| --- | --- |
| Yes/No | Virtual network service available? |
| Yes/No | Audio news and information service available? |
| Yes/No | Conference calling service available? |
| Yes/No | Voice messaging service available? |
| Yes/No | Message storage and forwarding service available? |
| Yes/No | Subscriber-directed call forwarding service available? |
| Yes/No | Personal speed dial service available |
| Yes/No | Emergency travel service available? |
| Yes/No | Guest access available? |

Initial Call Processing

Figure 8:
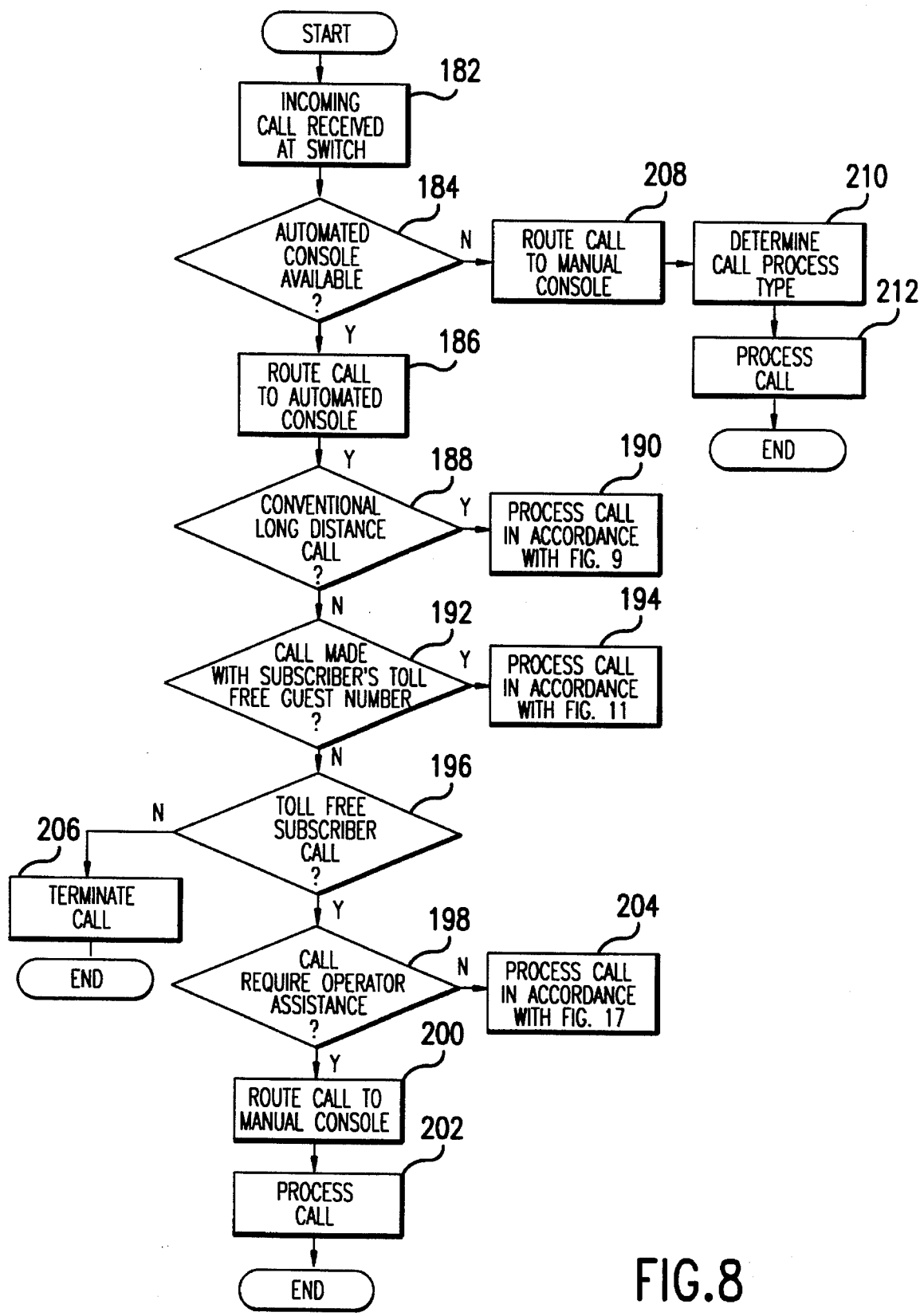
FIG. 8 is a flow chart illustrating the operations carried out by the long distance switching office of FIG. 2 in order to sort incoming calls into different types.

FIG. 8 illustrates the manner in which incoming calls received by the telephone switching system of the present invention are initially handled. In general, these calls will fall into three different categories. The first category includes conventional long distance calls placed by subscribers calling from their own homes or places of business, these subscribers having previously arranged to have their long distance service provided by the operator of the long distance switching office 34 of FIG. 1. Also included in this category are calls placed by guests of hotels and other establishments served by the long distance switching office 34; these calls may be charged to the guest directly, as in the case of a credit card call, or they may be billed to the establishment and then charged to the guest separately (e.g., as part of the guest's hotel bill).

The second category includes calls placed by subscribers who have arranged with the operator of the local telephone operating company to place calls through a particular long distance service provider's switching system. Such subscribers are differentiated from one another throughout this disclosure on the basis of the bundle of services they have arranged to receive from the long distance service provider. Subscribers that have arranged to receive the additional calling features and augmented services described previously, including long-distance calling from remote telephone stations, audio news and information services, conference calling, voice messaging, message storage and forwarding, subscriber-directed call rerouting, speed dialing, and certain operator-assisted services, are identified throughout this disclosure as "enhanced service subscribers", whereon subscribers having more conventional call features (e.g., "1+" calling and/or a long distance call charge card) are identified as being "standard service subscribers". Calls are placed by the enhanced-service subscribers using special access numbers, such as specific toll-free (800) numbers, which are reserved for this purpose and serve to identify the caller as being an enhanced service subscriber. A single access number may be provided for all enhanced-service subscribers, if desired, although it will be more advantageous to provide several access numbers for reasons which will be discussed hereinafter.

The third category of incoming calls includes calls received from third parties seeking to reach a subscriber or to leave a message with the subscriber's voice messaging service. These calls are placed on a separate group of reserved access numbers, such as toll-free (800) numbers, which are assigned to individual subscribers.

With specific reference to FIG. 8, incoming calls are received at the digital switching system 46, as indicated by block 182. At decision block 184, a determination is made as to whether an automated console is available. This determination is made on the basis of console (both automated and manual) long on at the switching system. If an automated console is available, then the call is routed to an automated console as indicated by block 186. At this point, the automated console initiates a procedure for identifying the call process type by determining, from the identity of the incoming lines, whether the incoming call is a conventional long distance call (i.e., neither a subscriber request for enhanced services nor a guest call to a subscriber's voice messaging service), as indicated by decision block 188. If the answer to this inquiry is in the affirmative, the call is processed in accordance with the procedure set forth in FIG. 9, as indicated by block 190. If the result of this inquiry is in the negative, the call is further evaluated, as indicated by decision block 192, to determine whether or not the incoming call is a toll-free guest call that is associated with a particular enhanced-service subscriber account. This determination is made based on whether the number dialed by the caller is one of the toll-free numbers that has been reserved for this purpose. If the console determines that the call is of this type, the call is then processed in accordance with the procedure illustrated in FIG. 10, as indicated by block 194. However, if the result of this determination is that the call has not been made by a subscriber's guest, the call is further evaluated, as indicated by block 196, to determine from the dialed number whether or not the call was originated by a subscriber in order to request enhanced services of the type described previously. If the answer to this inquiry is in the affirmative, a further decision is made in block 198, based on information entered by the subscriber, as to whether or not the requested service is of a type which requires handling at a manual console. Such calls will include, for example, person-to-person calls and requests for enhanced directory assistance. If the call is of one of these types, the automated console routes the call to a manual console for further handling as indicated by block 200. The call is then processed as requested by the subscriber, as indicated in block 202. At this point, the manual console releases control of the call to the switching system 46, and the initial processing of the call is complete.

In the specific case of a conference call request, the incoming call is routed to a conference operator stationed at a dedicated manual console similar to the manual console described previously. The use of a dedicated manual console allows the conference call to be established without occupying one of the consoles 48, 50 for the period of time required to contact all of the desired parties.

Figure 11:
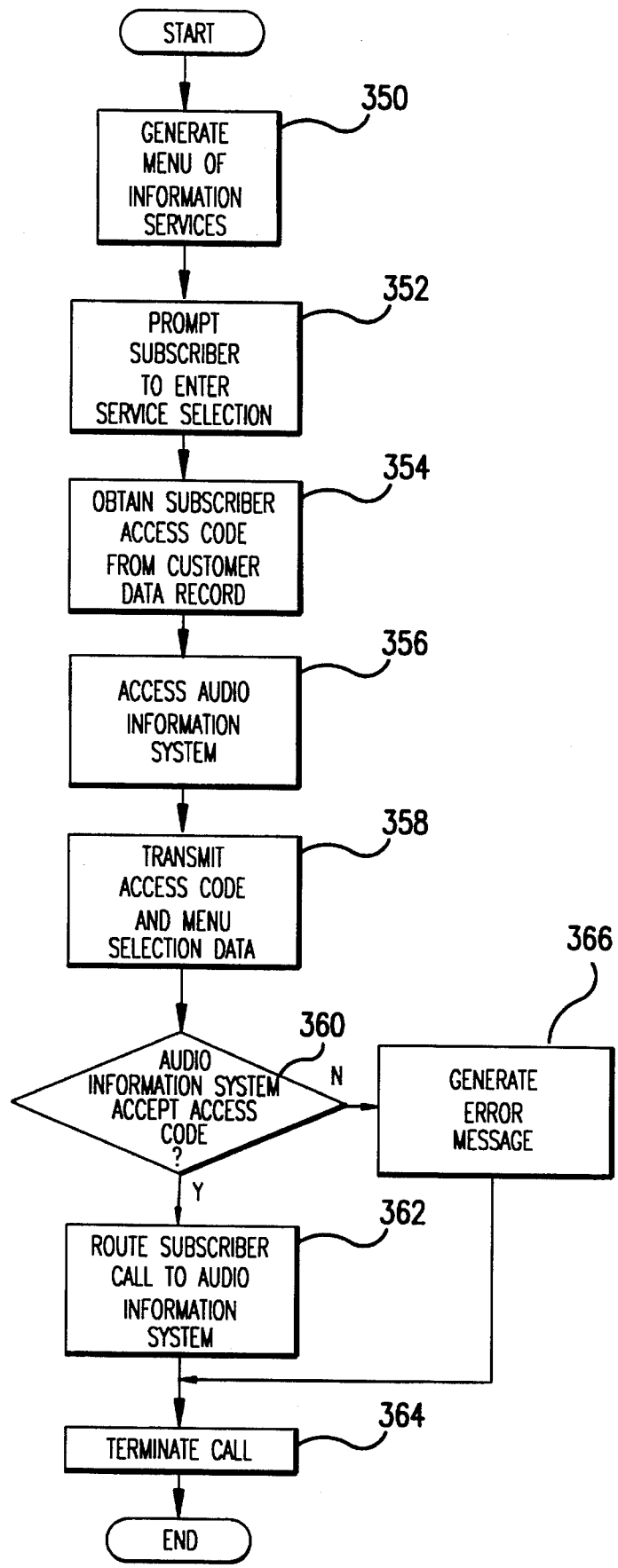
FIG. 11 is a flow chart illustrating the sequence of operations carried out by the long distance switching office of FIG. 2 to provide access to an audio news and information system.
Figure 12A:
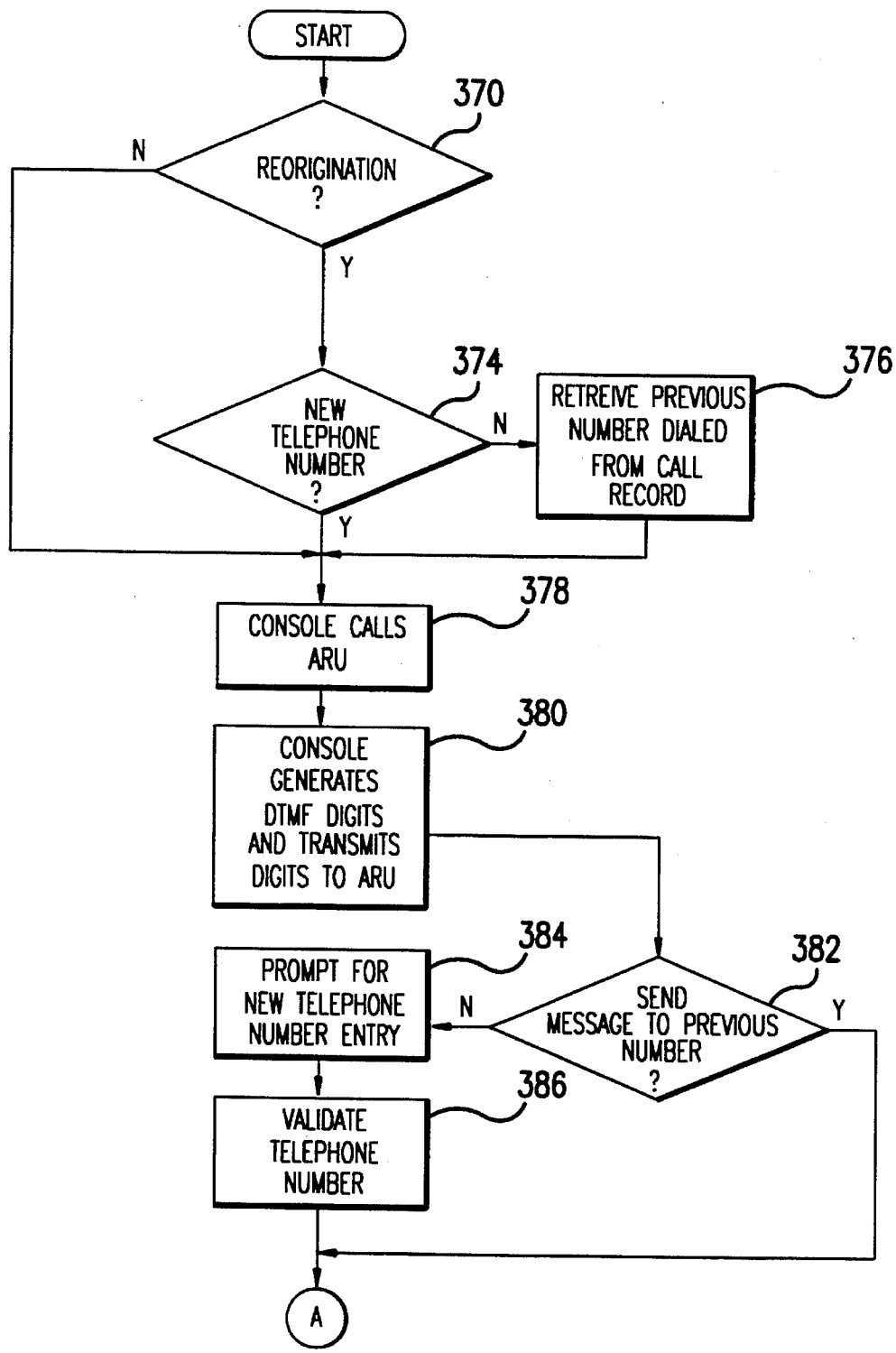
FIG. 12, consisting of FIGS. 12A, 12B, 12C, 12D and 12E, is a flow chart illustrating the sequence of operations carried out by the long distance switching office of FIG. 2 to provide message storage and forwarding services.
Figure 12B:
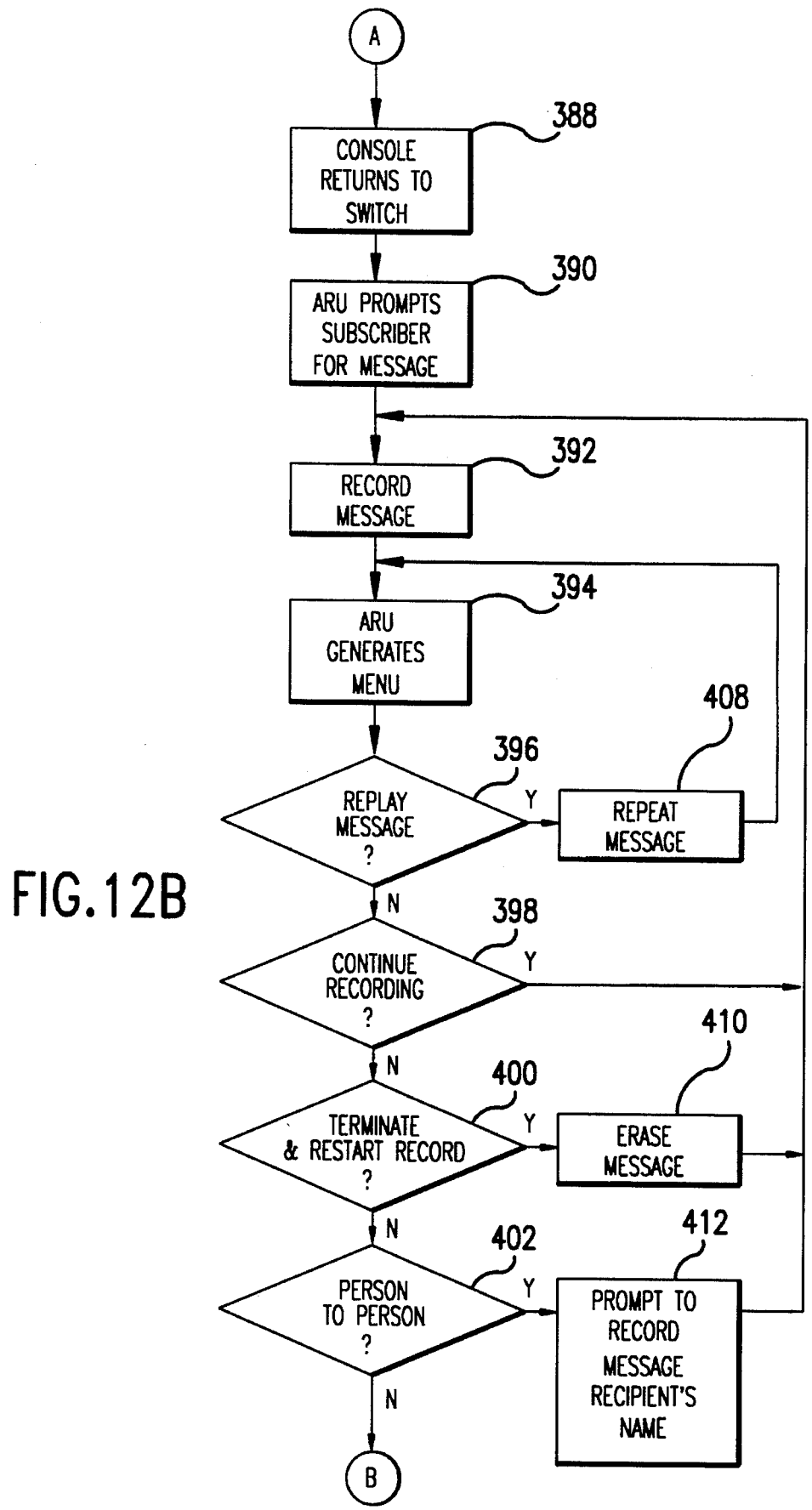
Figure 12C:
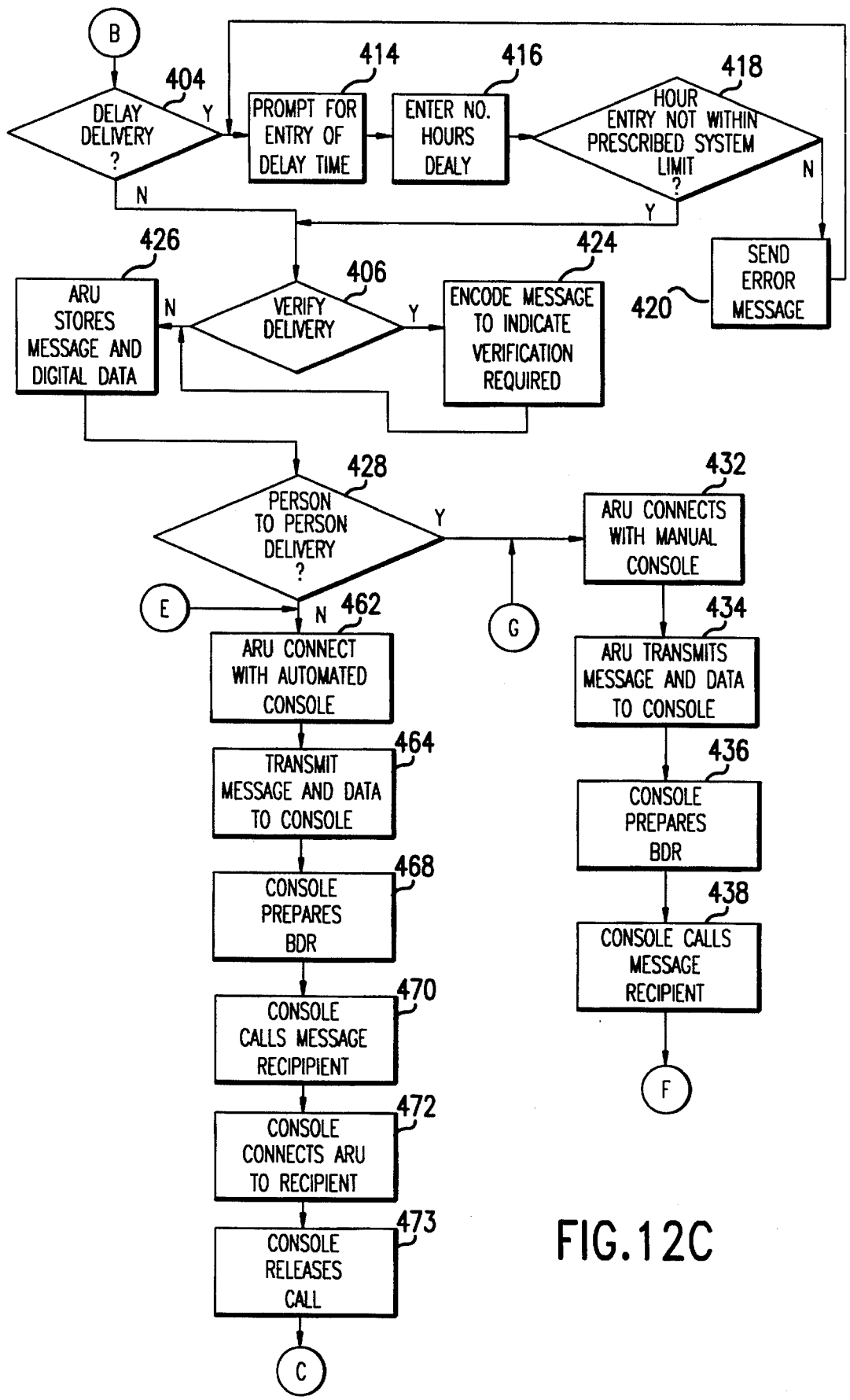
Figure 12D:
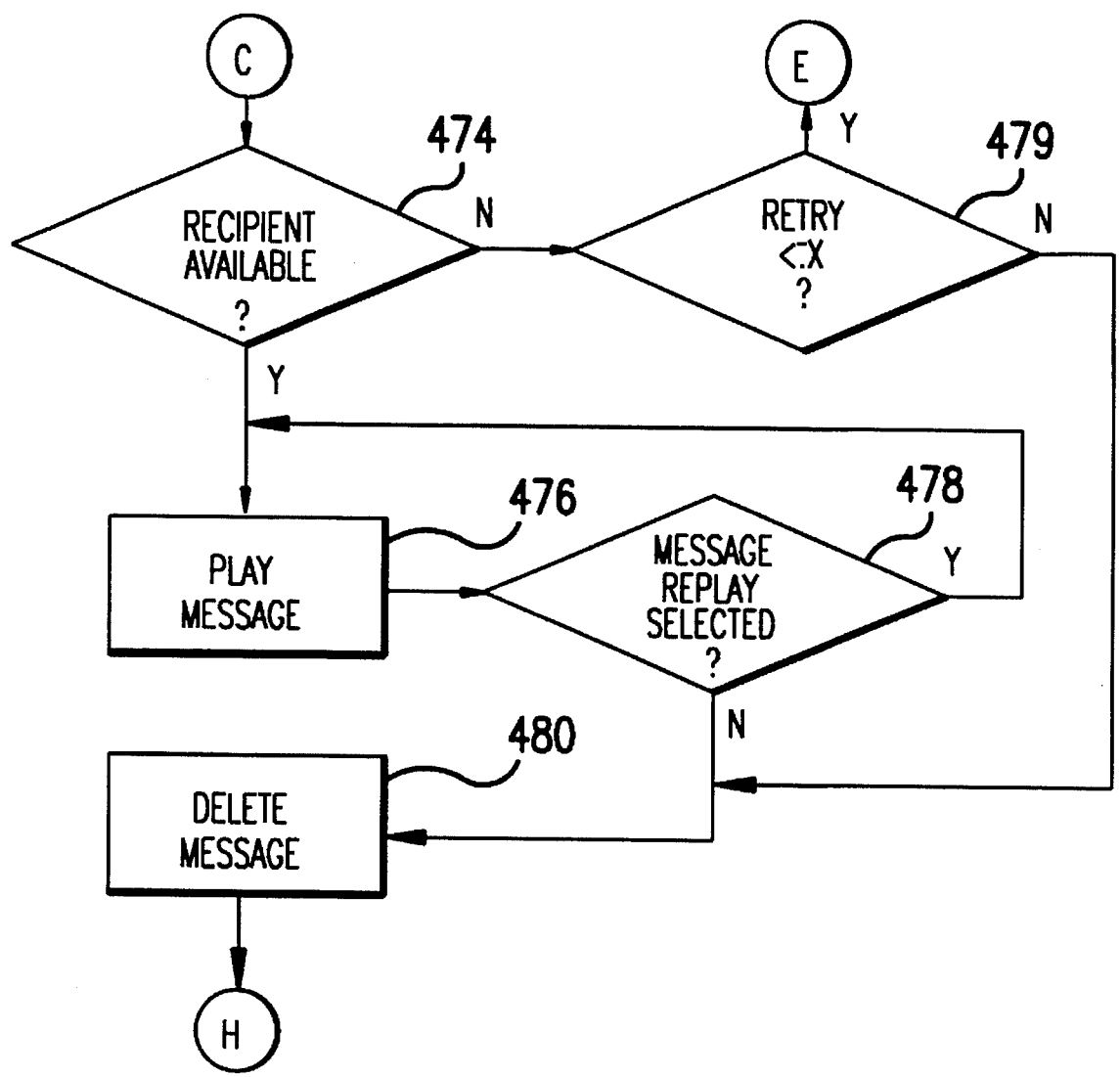
Figure 12E:
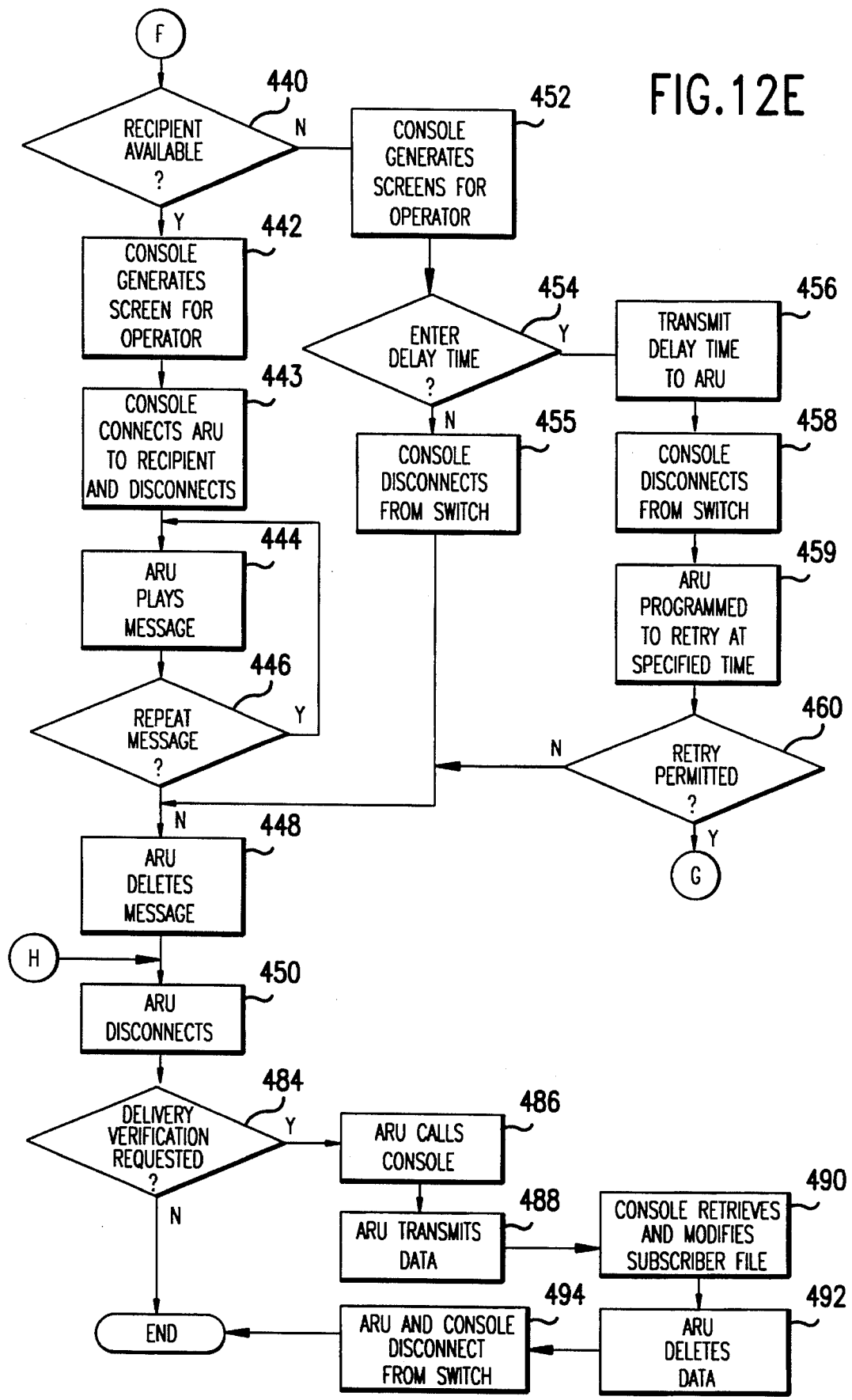

Referring once again to decision block 198, if the subscriber call is determined by the automated console to be of a type that does not require handling by a manual console, the call is processed, as indicated by block 204, in accordance with the procedure outlined in FIG. 11. On the other hand, if the automatic console had determined in block 196 that the incoming call did not originate from a system subscriber, the console terminates the call, as indicated by block 206.

Referring again to decision block 184, a determination that an automated console is not available causes the call to be routed to a manual console, as indicated in block 208. The manual console then determines the call process type, in block 210, in a manner substantially similar to that described previously in connection with blocks 188, 192 and 196. The call is then processed in the required manner, as indicated in block 212, whereupon the control over the call is relinquished to the switching system for the duration of the call.

Processing of Conventional Long Distance Calls

Figure 9A:
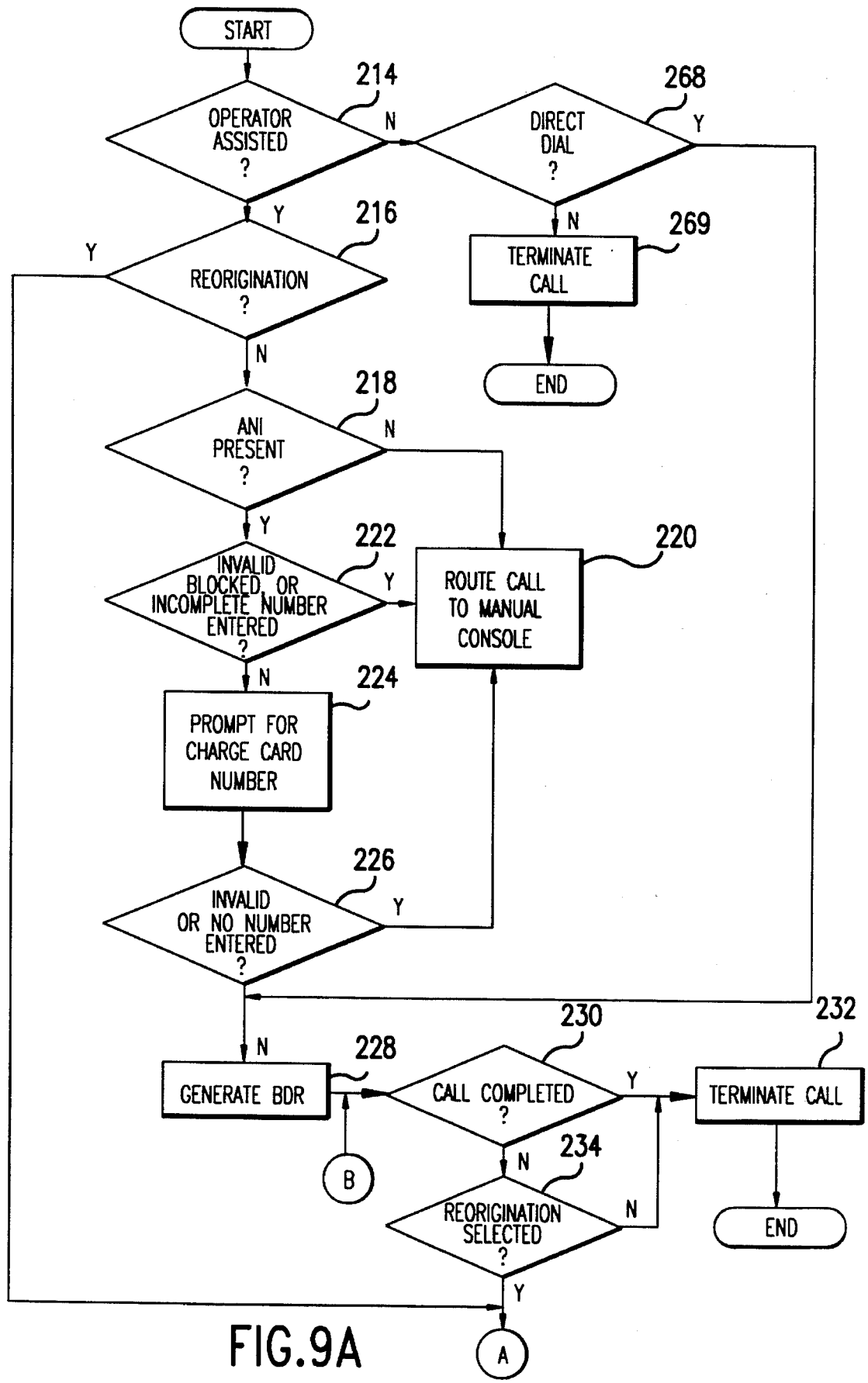
FIG. 9, consisting of FIGS. 9A and 9B, is a flow chart illustrating the manner in which conventional long distance calls are processed by the long distance switching office of FIG. 2.
Figure 9B:
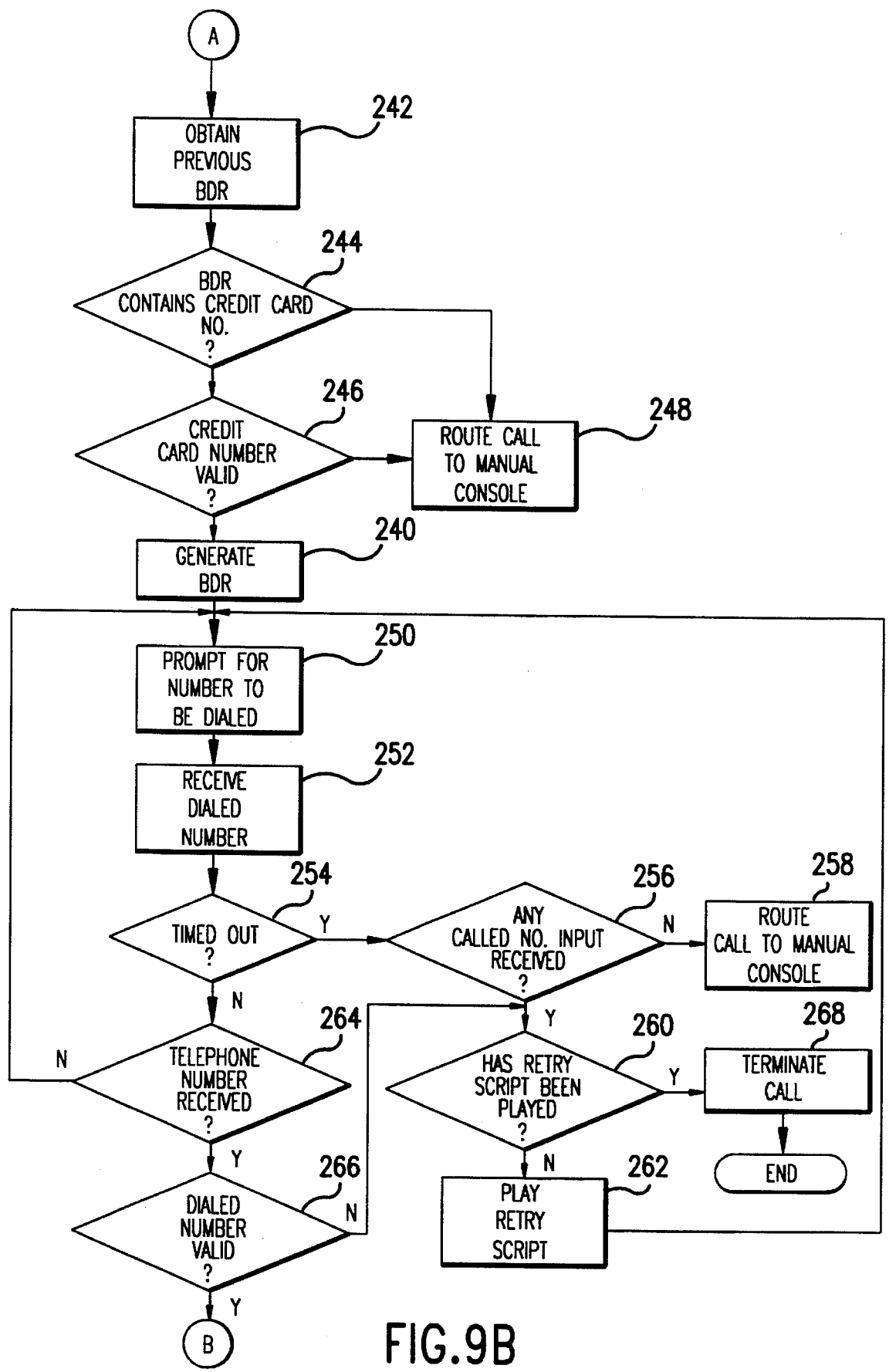

The manner in which the switching system of the subject invention processes conventional long distance toll calls, is illustrated in FIG. 9. The console initiates call processing by determining from the number dialed by the caller whether the call is of the operator-assisted type, i.e., "O+" prefix, indicated by decision block 214. If the outcome of this evaluation is in the affirmative, the call is next evaluated in decision block 216 to determine from information provided by the caller (e.g., a specific keypad input such as "#") whether it is a reoriginated call. The term "reoriginated" and its variants as used herein refers to the process of placing a subsequent telephone call without going off-hook, a function which is sometimes provided by long-distance switching systems. If the telephone call being handled by the automated console is determined not to have been reoriginated (i.e., if the call is determined to be an original call), the call is evaluated for billing purposes, as indicated by decision block 218, as to whether or not an automatic number identification (ANI) accompanies the signal representing the dialed number. The ANI serves to identify the telephone number of the station from which the call is originated. Failure to detect the presence of an ANI results in transfer of the call to a manual operator console, indicated by block 220 for processing thereby.

In the event that an ANI is detected, the console evaluates the dialed number, as indicated by decision block 222, to determine whether the dialed number is invalid. Invalid calls can arise from the dialing of telephone numbers that are not in the proper national plan area (NPA) format, or that are otherwise properly formatted but are not in use. If the called number is determined to be invalid for any reason, the called number is transferred to a manual console, as represented by block 220, for further handling. User input in response to this prompt is evaluated, as indicated by block 226, to determine whether the credit card number entered by the caller is invalid, blocked, incompletely entered, or absent altogether. If the result of any of these credit card inquiries is in the affirmative, the call is routed directly to a manual operator console, as indicated by block 220; otherwise, entry of a valid account number results in generation of a bill data record (BDR), as indicated at block 228. Following generation of the BDR, the console awaits receipt of confirmation from the switching system 46 that the dialed call has been answered at the destination telephone station. As indicated by decision block 230, if the console has received such confirmation, the console releases call processing control to the switching system, as indicated by block 232. If the call has not been completed, as can occur upon failure of the intended call recipient to answer, the caller can choose to reoriginate another call, as indicated by block 234. Upon failure to select reorigination within a prescribed time interval, the console releases the call to the switching system for call handling and/or termination.

Reoriginated calls are subjected to a credit validation process for the purpose of minimizing the occurrence of fraudulently charged calls. Accordingly, the console retrieves from a file server 52 the BDR generated from the proceeding call, as indicated by block 242, for further call verification. As indicated by block 244, if the recalled BDR contains a credit card number in the billing number field thereof (Table I), the console accesses a credit information database to validate the credit card number, as indicated by block 246. Following credit card validation, the console generates a new BDR, as represented by block 240. However, if the outcome of either of decision blocks 244 and 246 is in the negative such that no credit card number is listed in the retrieved BDR or the card number in the BDR has not been validated, respectively, the call is routed to a manual console, as indicated by block 248.

In addition to the ANI verification and credit card validation procedures described above, it is desirable to implement as a further aspect of the aforementioned credit validation process a system by which a limitation is imposed on the number of reoriginated calls that is permitted for any single access of the switching system. For this reason, the console is programmed to increment a reorigination status counter field of the BDR upon each reorigination. Once the reorigination status counter field reaches a prescribed number, the console is programmed to terminate the call, irrespective of the validity of the credit card number or the presence of ANI. Once the console has generated a new BDR, as indicated by block 240, the console prompts the caller to enter a new number to be dialed, as shown by block 250. The caller is provided with a predetermined amount of time to input the telephone number to be dialed. During this time interval, the console is operable to receive call number input, as shown by block 252. In the event that the time interval has expired before the caller has completed key pad selection of the telephone number, as indicated by decision block 254, the console will monitor the line assigned by the switching system to carry the reoriginated call in order to determine whether any called number input has been provided by the caller, as shown by block 256. If the response to this inquiry is in the negative, the call is routed directly to a manual operator console, as shown by block 258. However, if at least partial called number input has been received at the console, the console will then determine, in accordance with block 260, whether an audible re-try script has yet been provided to the caller by the DSP 162. Previous play of the re-try script results in routing of the call to the manual operator console 258. However, if the outcome of the decision process noted by block 260 is in the negative, the re-try script is played, as noted by block 262, and thereafter a prompt is produced by the console in the manner noted at block 250 for caller input of a number to be dialed.

With reference once again to decision block 254, if the outcome of the evaluation noted therein is that the predetermined time interval has not yet expired, the console monitors the line carrying the reoriginated call to determine, as noted by block 264, whether a dialed number has been entered by the caller. Failure of the console to receive dialed number input results in regeneration of the prompt for entry of the number to be dialed, as noted by block 250. However, upon an outcome at block 264 that a telephone number has been dialed, the console determines as a function of microprocessor 152 programming, as indicated by block 266, whether the dialed number is valid (e.g., whether the entered number complies with numbering plan area (NPA) standards. Upon determination of an invalid telephone number entry, the console under processor control determines the audible re-try script has yet been played, as noted by block 260. In the event that the re-try script has been re-played, the call is terminated at the switching system 46, as shown by block 268; otherwise, the console generates for the caller a re-try script, as noted by block 262. An affirmative outcome of the valid number determination designated by block 266 results in the console requesting confirmation from the switching system that the dialed call has been answered at the destination station, as described above in connection with decision block 230. Thereafter, the call is processed in accordance with the procedures described above with regard to blocks 232 and 234.

Referring once again to decision block 214, console determination on the basis of call line input that the call being handled by the console is not of the operated-assisted typed results in a further console evaluation, indicated by block 268, as to whether the number dialed is of a type that was dialed directly by the caller. If the outcome of this evaluation is in the affirmative, a BDR is generated, as indicated by block 228, after which the call is processed in accordance with the manner described above and depicted in the ensuing blocks of the flow diagram. However, identification of the call as not being of the direct dial type results in release of the call from the console to the switching system, as shown by block 269.

Processing of Enhanced Service Requests

Figure 10A:
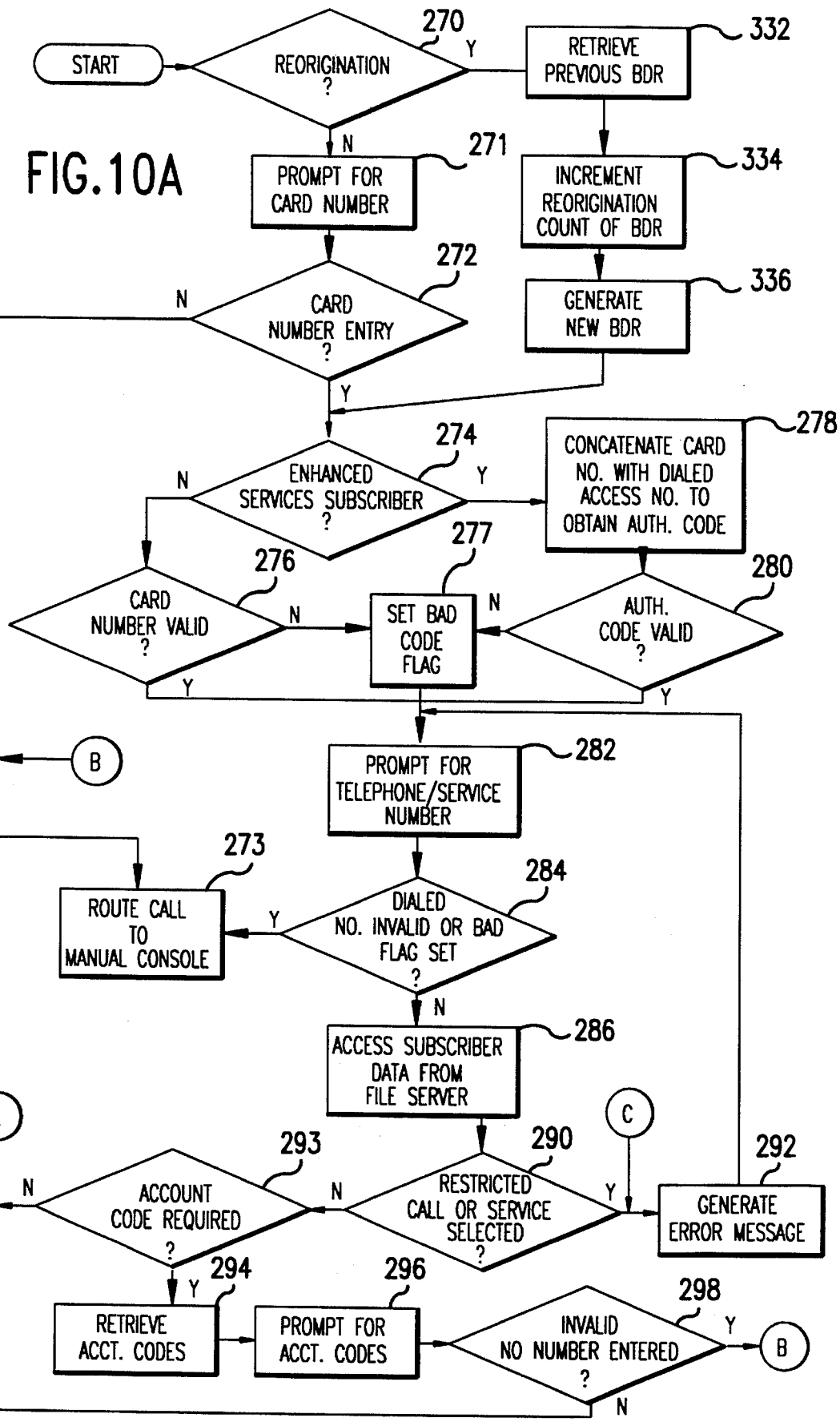
FIG. 10, consisting of FIGS. 10A and 10B, is a flow chart indicating the manner in which incoming calls requesting enhanced subscriber services are processed by the long distance switching office of FIG. 2.
Figure 10B:
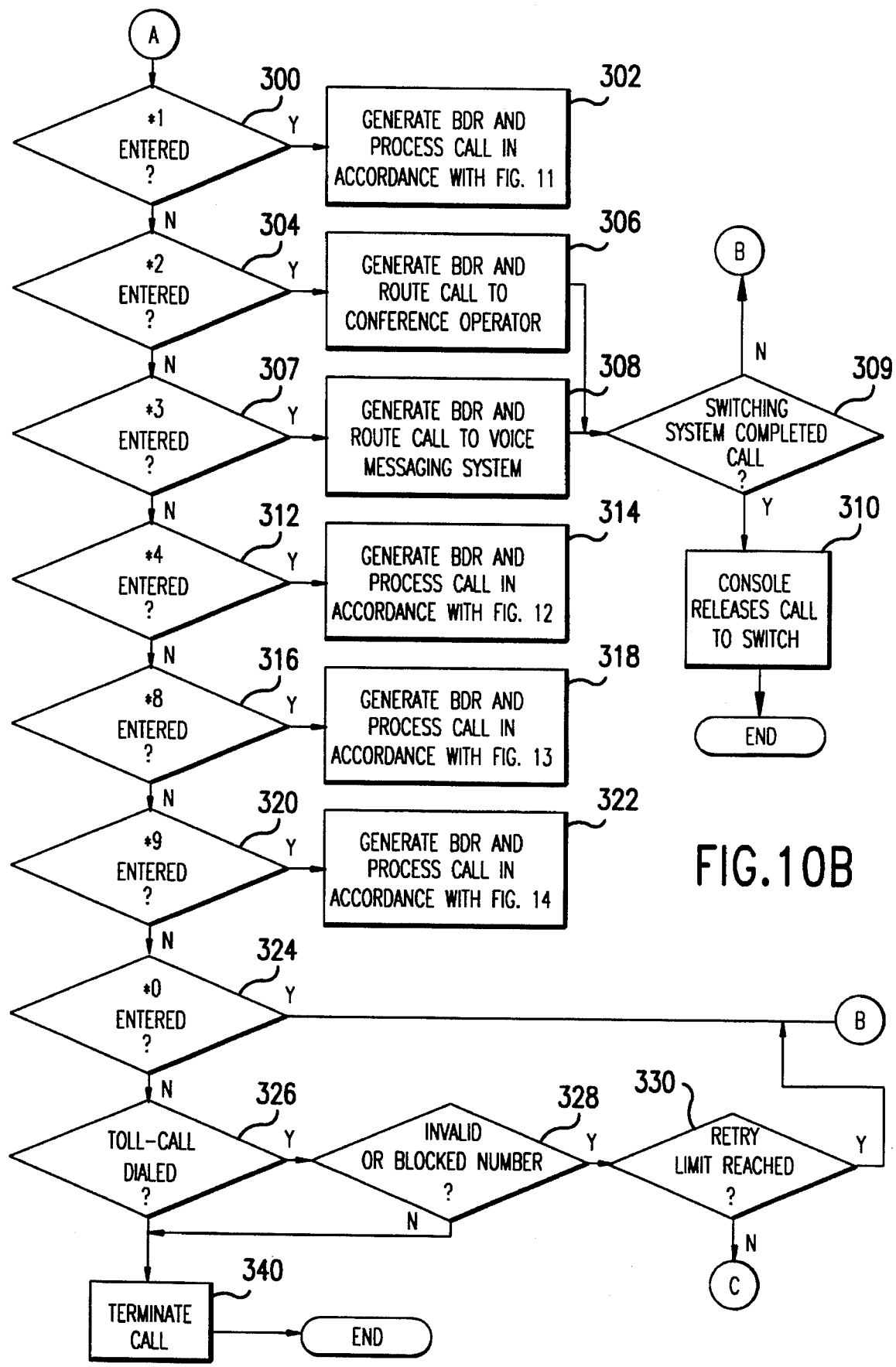

As noted previously, the switching system is capable of determining on the basis of the access number dialed by the caller whether the incoming call is one that has been placed by a system subscriber, as subscriber access numbers are identifiable at the switching station. The call processing scheme illustrated in FIG. 10 is implemented in response to such a determination. Upon starting of the subscriber processing scheme, the automated console determines on the basis of user input whether the call to be processed is a reoriginated call. As described above in connection with FIG. 9, reoriginated calls are handled by the system of the subject invention in a manner which differs from that associated with the handling of original calls due to the fact that reoriginated calls can be traced for fraud prevention and validation purposes directly to the billing data record (BDR) that was created during processing of the preceding call. Upon failure to detect the presence of reorigination input from the subscriber, as noted by block 270, the console prompts the subscriber to enter his account card number, as shown by block 271, and monitors the call line for entry of the card number, as noted by decision block 272. A negative outcome to decision block 272 results in the routing of the call from the automated console to a manual operator console 273 for further processing.

If a card number is entered, the console determines, on the basis of program control, whether the card number sequence entered by the subscriber is that of an enhanced services subscriber, as shown at decision block 274. Identification of enhanced services subscribers at an early stage of call processing is advantageous, for such identification permits for expedited call handling and evaluation of such subscribers' requests for enhanced services, as will be discussed hereinafter. If the entered card number is not identifiable with an enhanced services provider, thereby identifying the caller as a standard rather than enhanced services subscriber, the console accesses a file server 52 to validate the entered card number, as shown at block 276, by confirming the account status of the subscriber to whom the account number has been issued. If the entered card number cannot be validated from the data available in the file servers 52, a "bad flag" is set, as indicated by block 277, and included in the packet of identifer information that accompanies the call as it is further processed by the console. However, if the entered card number is identifiable as being that of an enhanced services subscriber, the entered number is concatenated with the dialed system access number in a predetermined manner to obtain the enhanced services subscriber's authorization code, as indicated by block 278. Because the authorization code for enhanced services subscribers is the result of a concatenation process involving the dialed access number, the same dialed access number can be assigned to more than one subscriber. As a consequence of this arrangement, subscriber files for groups of subscribers can be readily accessed on the basis of the dialed access number. As was described previously, the card number for enhanced services subscribers typically has fewer digits than does that of standard services subscribers. Accordingly, the time required to enter the card number is reduced, as is the opportunity for erroneous number input. Once obtained, the authorization code is validated, as indicated by block 280, in the manner described above for standard services subscribers, i.e., by accessing data from one or more file servers 52. As enhanced services subscribers can be categorized as a group, their early identification in the call processing regimen allows for segregation of their subscriber files for more expedient accession. Failure to validate the authorization code results in the setting of a "bad flag" in the manner described above in connection with block 277.

Following the validation of the respective card numbers (block 276) and authorization codes (block 280), the console prompts the subscriber to enter the desired telephone number to be dialed or the designation code of an enhanced service, as indicated by block 282. Thereafter, the automated console determines under program control whether a telephone number has been entered, whether the number entered requires operator assistance, whether the number entered is of an invalid format or relates to a non-existent telephone number, or whether the "bad flag" has been set. If the result of any of these evaluations, denoted by block 284, is in the affirmative, the console routes the call to a manual console 278. Delayed routing of "bad flag" designated calls until after caller entry of a dialed number is advantageous for it allows for the identification of suspect telephone numbers for further charge call abuse counter-measures. However, if the entered number is in a valid format and corresponds to an existing telephone number, the console accesses the subscriber file from a file server 52, as shown by block 286.

Once the console accesses the subscriber file, the console determines, as shown at block 290, whether the dialed number falls within any restriction noted on the subscriber file. Call restrictions can include prohibitions against the dialing of international long distance telephone calls, calls to telephone numbers that have been blocked or prohibited at the service subscriber's request, as well as calls that can be restricted during certain hours of the day or evening. If the outcome of any of these evaluations is in the affirmative, the console generates an error message, as denoted by block 292, and the console generates a prompt for entry of a new telephone number in the manner denoted by block 282 and described above. If the telephone caller service that has been selected is not of a restricted nature, the automated console, as shown by block 293, next determines whether an account code is required to process a call to access the selected telephone number or to provide a specified service. The account code can be used by the enhanced services subscriber to designate an individual user or client so as to facilitate account reconciliation among a plurality of users or clients. In the event that the subscriber data indicates that an account code is required before a specific service can be utilized, the automated console retrieves from the file server the account codes included in the subscriber file, as indicated by block 294, and generates a prompt for entry of the account code, as shown by block 296. The console monitors the call line for entry of the account code and compares the entered account code with the account codes listed in the subscriber file, as shown by block 298, to determine whether the code entered by the caller is valid. In the event that an account code is not entered or that the presented account code is invalid, the call is routed to the manual console, as shown by block 278. However, in the event that an account code is not required (block 292) or that the proffered account code is valid (block 298), the console processes the call in accordance with the nature of the telephone service selected or the toll call entered.

Once the issue of account code requirement and validity has been resolved, the automated console then determines through a plurality of decision processes described below the manner in which the call is to be handled. As indicated by decision block 300, the console evaluates subscriber input prompted for at block 282 to determine whether an audio news and information service has been selected. Upon entry of the appropriate subscriber input for this service, the console generates a new BDR and processes the call in accordance with the procedural scheme illustrated in FIG. 12, as indicated by block 302 in FIG. 10. If the subscriber fails to select the news and information service, the console determines in accordance with subscriber input whether another service, in this instance the conference call feature, has been selected, as designated by block 304. If the result of this evaluation is in the affirmative, the console generates a new BDR and routes the call to a conference call operator, as indicated by block 306, for establishing a conference call between a subscriber and two or more third parties.

In the absence of conference call service selection, the console determines from subscriber input whether a further service, in this instance the voice messaging service, has been selected, as indicated by block 307. If voice messaging has been selected by the subscriber, the console generates a new BDR and routes the call through the switching system, as shown by block 308, to a voice messaging subsystem 47 for handling thereby. For both conference call and voice message service selection, the console awaits confirmation from the switching system that the switching system has successfully connected the subscriber's call to the respective systems 51 and 47, respectively, as indicated by block 309. Upon failure at the console to receive such confirmation, the console routes the call to a manual console, as indicated by block 278; otherwise, the console releases processing control of the call to the switching system, as indicated by block 310. Subscriber selection of the voice messaging option, as described in detail below, allows a guest caller to whom the subscriber has provided the subscriber's personal toll-free access number to record a message for playback to a subscriber. Further details of the voice messaging option and the manner by which a subscriber's personal toll-free number is utilized, are described in greater detail below with reference to FIGS. 13 and 17.

If the subscriber has not selected the voice messaging service, the console determines from subscriber input whether the service feature of message store and forward has been selected, as denoted by block 312. In the event this service has been selected, the console produces a new BDR and processes the call in accordance with the scheme set forth at FIG. 12, as designated by block 314 in FIG. 10. However, if the message store and forward service has not been selected by the subscriber, the console determines from subscriber input whether the service feature of incoming call re-direction has been selected, as designated by block 316.

Incoming call re-direction relates to the feature of re-routing of an incoming telephone call placed with a system subscriber's personal toll-free number to a subscriber telephone number and location which may or may not be known to the caller. Upon subscriber selection of this feature, the console creates a new BDR and processes the call in accordance with the scheme set forth at FIG. 13, as is indicated by block 318 in FIG. 10.

In the event the subscriber fails to select the incoming call re-direction feature, the automated console determines from the nature of subscriber input whether the subscriber has selected the speed dial feature, as denoted at block 320. Speed dialing is a feature by which a subscriber can store at a speed dial memory location in the subscriber file a telephone number, thereby permitting the subscriber to dial the stored telephone number in its entirety upon accessing the speed dial memory location. While a variety of speed dial memory locations can be provided to a subscriber in conjunction with the myriad of services provided by the telephone system of the subject invention, the preferred embodiment of the subject invention provides a total of nine speed dial memory locations for each subscriber. In instances where the subscriber has accessed the speed dial service, the console originates a new BDR and handles the call in accordance with the manner set forth at FIG. 14, as shown by block 322 in FIG. 10.

In the event that the call is reoriginated by the subscriber upon entry of an appropriate key pad input, in the manner indicated at block 270, the console retrieves from a file server a BDR generated for a previous call, as indicated by block 332. Following BDR retrieval, the console increments a value in the reorigination status counter field of the previous BDR, as indicated by block 334, and stores the value in the reorigination status counter field of a newly-generated BDR, as shown at block 336. The console also retrieves at this time the credit card number from the billing number field of the previous BDR and stores the card number in the same field of the newly-generated BDR, as indicated by block 338. Following BDR generation in the foregoing manner, the call is processed in accordance with regimen as described above in connection with block 280. However, following subscriber selection of a service or dialing of a call, the new BDR produced at block 336 is revised to include the call type field of the BDR, the identity of the specific service selected or of the number dialed.

As represented by decision block 324, subscriber entry of the operator assistance code in lieu of any of the foregoing subscriber services denoted in blocks 300, 304, 308, 312, 316 and 320 results in console routing of the telephone call to a manual console, as shown by block 278. In the event that the subscriber has not entered a request for operator assistance, the console determines from the subscriber input or lack thereof whether a toll call has been dialed, as noted by block 326. Upon subscriber input of a telephone number at block 282, the console next determines from the dialed number whether the dialed number is invalid or corresponds to a blocked telephone number by accessing file server data and comparing therewith, as indicated by decision block 328. Upon console identification of the dialed number as being invalid, the console next determines a re-try or re-dial limit for the console control program for the entry of a telephone, as indicated at block 330. The re-try limit relates to the number of times the console handling the subscriber's call will permit the subscriber to re-dial a telephone number for processing by the console. The re-try limit is established by the services provider and usually is a number not in excess of two. Once the re-try limit has been reached, the console routes the call directly to a manual console, as indicated by block 278. However, in the event the re-try limit has not been reached, an error message is generated in the manner described above in connection with block 292, and a prompt is generated by the console for entry by the subscriber of a further telephone number to be called or of a service to be selected, as set forth in block 282 above. In the event that subscriber input is not received by the console for selection of an enhanced service or the entry of a number to be dialed, the call is disconnected at the switch, as indicated by block 340.

Audio News and Information Service

As was noted in connection with the discussion of FIG. 11 above, an enhanced service subscriber can request to receive audio news and information service following account validation by the console handling the subscriber call upon the entry of a command such as "*1" through his telephone touch tone key pad. The information service is provided by an audio news and information system that is connected to the digital switching system 46 of the long distance facility of the subject invention so as to communicate with the manual and automated operator consoles 48 and 50. The news and information system comprises a database of prerecorded audio reports on news, weather and other information such as prevailing stock market rates that is periodically updated and transmitted to the subscriber under the control of the operator console handling the subscriber's call.

With reference to FIG. 11, following subscriber key pad entry for selection of the news and information service, the operator console generates an audible menu of information services that includes, for example, news, weather and stock market reports, as indicated by block 350. The operator console prompts the subscriber to select from among the menu options in order to listen to a specified, pre-recorded report, as indicated by block 352. Thereafter, the operator console accesses the subscriber file in the file server to obtain the subscriber's access code for utilizing the information system, as represented by block 354.

The console accesses the news and information through the switching system by transmitting a signal representative of the subscriber's system access code and the particular news and information service selected by the subscriber, as indicated by blocks 356 and 358. The news and information system determines from the transmitted signal whether the access code is valid, as indicated by decision block 360. If the transmitted access code is determined by the news and information system to be valid, the console routes the subscriber's call through the switching system to an in-going line of the news and information system, as shown at block 362, prior to relinquishing of call processing control to the switching system, as indicated by block 364. If, however, the news and information system does not recognize the subscriber's transmitted access code, the console generates an error message, as indicated by block 366, and call processing control to the switching system, as indicated by block 364.

Message Storage and Forwarding

The flow chart depicted in FIG. 12 provides a functional description of the manner in which the long distance service facility of the present invention provides enhanced services subscribers with the capability of recording messages and automatically routing messages to designated telephone numbers in real time or on a time delay basis. The message store and forward service is implemented by use of one or more audio response units (ARU) 49 which are connected to the switching system so as to communicate with the automatic and manual operator consoles 48 and 50 described above. In a preferred implementation, the audio response units may be of the type which are available from Reception Technology of Canton, Mass. The message store and forward service is selected upon entry by a subscriber through his telephone key pad of an appropriate command, such as "*4".

Following the subscriber's request for this service, the operator console processing the subscriber's call accesses a file server 52 and retrieves the most recently generated BDR (if any) to determine whether the subscriber's call has been reoriginated, as indicated by block 370. In instances where the call has been reoriginated, the console obtains the dialed number from the previously retrieved BDR, as indicated by block 376, in preparation of forwarding a recorded message in the manner described below to the previously dialed number in the event that the subscriber does not designate a new number to be dialed as represented by the negative outcome of decision block 374.

As indicated by block 378, the console processes a call to the ARU through the switching system and proceeds to transmit to the ARU a series of dual tone multi-frequency (DTMF) digits that will uniquely identify a billing data record that is to be generated by the console that ultimately delivers the voice mail message, as indicated by block 380. The digital data transmitted by the console to the ARU further comprises data instructing the ARU to verify delivery of a message in cases where the subscriber has requested such verification, as well as the previously dialed number obtained from the BDR. In instances where the subscriber does not desire to send a message to a previously-dialed telephone number (e.g., where the subscriber has not requested call reorigination or has specified a new telephone number for message delivery), as indicated by block 382, the ARU prompts the subscriber for entry of a new telephone number, as shown by block 384. The entered telephone number is validated by the ARU on the basis of NPA standard format, as indicated at block 386. The console subsequently instructs the switching system to connect the subscriber to the ARU for message recordation and releases call processing control to the switching system, as shown at block 388.

Once the console has relinquished control over the subscriber call, the ARU generates a tone, as indicated by block 390, which prompts the subscriber to commence with recordation of a message. After the subscriber has transmitted a message for recordation by the ARU, as designated by block 392, the ARU generates an audible menu (block 394) which allows the subscriber to select from a plurality of options, including replay of the recorded message, continuation of the recording time, and termination and restart of recording, as indicated by blocks 396, 398 and 400, respectively. Further, the ARU allows the subscriber to prepare a recorded message for person-to-person delivery, to specify a time interval by which delivery of the message is to be delayed, and to request verification of message delivery, as indicated by blocks 402, 404 and 406, respectively. The service options designated at blocks 398 through 406 are available in sequential manner in instances where the outcome of proceeding evaluative processes, e.g., blocks 396 through 404, are in the negative.

With respect to the menu option of message replay (block 396), if the subscriber selects replay of a recorded message, the message is replayed for the subscriber by the ARU, as shown at box 408, after which the ARU generates a menu as above in connection with block 394. A subscriber's selection of the ARU menu options, as represented by blocks 400 and 402, results in message erasure by the ARU (block 410) or generation of an ARU prompt (box 412) notifying the subscriber to record the name of the message recipient, respectively, after which a message can be recorded by the ARU, as indicated by block 392. Following selection of the "delay delivery" option indicated at block 404, the ARU prompts the subscriber to specify the number of hours by which message delivery is to be delayed, as indicated by box 414, and records the number of hours in digital memory along with the recorded message, as indicated by block 416. Thereafter, the ARU determines whether the subscriber-selected number of hours by which message delivery is to be delayed falls within prescribed limits of the system (block 418). If the specified message delivery delay does not fall within system limits, the ARU generates an error message, as shown at block 420, and the subscriber is prompted once again for entry of the desired delivery delay, as indicated by block 414. If the originally-entered delivery delay falls within prescribed system operational limits, or if message delay (box 404) is not selected, subscriber selection of the delivery verification feature is evaluated in the manner shown at block 406. In instances where verification has been requested by the subscriber, the ARU encodes the recorded message, as indicated by block 424, in such a manner as to instruct the ARU to effect a call to an automated console and to confirm therewith the delivery of the subscriber's recorded message. Once the subscriber has completed message recordation and utilization of the menu options, the ARU stores the message and associated data (e.g., message delay time, delivery verification control data) in digital memory, as indicated by block 426.

The person-to-person delivery option provides for delivery of a subscriber's message to a specific individual located at the designated telephone number, rather than for message delivery to any party answering at the terminating station. To effect person-to-person message delivery, the ARU completes a call through the switching system and accesses a manual operator console, as represented by block 432, which in turn generates scripts to guide the operator through the process of connecting a person-to-person call for message delivery. The ARU proceeds to transmit to the manual console the digital data associated with the recorded message which is utilized by the console to prepare a billing record, as indicated by blocks 434 and 436, respectively.

The console operator processes a call to the message recipient, as indicated by block 438, and determines whether or not the intended message recipient is available, as indicated by block 440. If the specified message recipient answers the console-initiated call, the manual console generates various scripts, as indicated at block 442, to instruct the operator to announce to the call recipient that a message is being forwarded. The optional recording of the subscriber's pronouncement of the recipient's name is also provided by the ARU to the console operator in instances where the operator is providing person-to-person message delivery service. To effect message delivery, the console operator connects the ARU through the switching system to the message recipient call line, as indicated by block 443, and subsequently releases call process control to the switching system. The ARU provides the specified message recipient with options to play and to replay the recording of the message as indicated by blocks 444 and 446, respectively. Following message delivery and replay (if any), the ARU deletes the message (block 448) and disconnects from the switching system, as represented by block 450.

If the ARU has stored data acknowledging a subscriber's request for delivery verification in memory, the ARU proceeds to complete a call through the switching system to an automated console, as indicated by block 486. As indicated by block 488, the ARU transmits to the automated console the stored data which was originally transmitted by the console processing the subscriber's request for message store and forward service, and which uniquely identifies a billing data record that was created by the console delivering the subscriber's message. The automated console utilizes the transmitted data to access and modify an appropriate subscriber data file in the file server to acknowledge receipt of delivery verification from the ARU, as indicated by block 490. The subscriber file verification data can be used to alert the subscriber originating the message as to the success of message delivery via a recorded message directed to the subscriber directly or to the subscriber's voice mailbox. Following transmission of the data, the ARU deletes the data from memory (block 492), and the ARU and the console disconnect from the switching system (block 494).

With reference again to decision block 440, if the specified message recipient is unavailable, the manual console generates scripts to instruct the operator to request from the answering party a time at which the message recipient might be reached, as indicated by block 452. If the answering party suggests a delivery delay time, as indicated by block 454, the operator transmits a signal to the ARU which operates to instruct the ARU to attempt message delivery through a manual console after the specified time, as indicated by block 456. If no such delivery delay time is specified by the call recipient, the manual console releases call process control to the switching system (block 455), and the ARU deletes the recorded message (block 458) prior to disconnecting from the switching system (block 450). Following transmission of a specified delay time, a time interval that is usually selected in one hour increments, from the console to the ARU, as shown at block 456, the console relinquishes call process control to the switching system, as shown at block 458 and the ARU is programmed accordingly to delay message delivery, as indicated by block 459. Once the selected message delivery delay time has passed, the ARU can again dial a manual console to attempt message delivery in accordance with system parameters, as indicated by block 460. The system can be configured to allow only a prescribed number of unsuccessful delivery attempts before the subscriber's message is removed from ARU memory and the ARU disconnects from the switching system, as represented by blocks 448 and 450. If another attempt at message delivery by the ARU is permissible, the ARU proceeds to process a call to a manual console, as represented by block 432.

With reference once again to block 428, in instances where the subscriber has not selected the person-to-person option, the ARU completes a call through the switching system to access an automated operator console and transmits thereto message data including the telephone number designated for delivery, as represented by blocks 462 and 464. As indicated by block 466, the console uses the transmitted data to connect the ARU through the switching system to the station corresponding to the designated telephone number and to prepare a billing detail record (BDR), as indicated by block 468.

As indicated by blocks 470 and 472, the console proceeds to process a call using the new or reoriginated recipient telephone number to connect the ARU through the switching system to the message recipient's line prior to disconnecting itself from the switching system, as represented by 473. As represented by blocks 474, 476 and 478, if the recipient's dialed number is answered, the ARU transmits the recorded message to the answering party and generates a prompt notifying the recipient of the availability of message replay. If the answering party selects message replay, the ARU replays the message to the answering party through the switching system, as noted at block 476. Following delivery of the message, the ARU deletes the message from memory (block 480) and disconnects from the switching system (block 450). In instances where the subscriber originating the message has requested delivery verification, ARU completes a call to an automated console as described above in connection with block 484.

Returning to block 474, if the intended call recipient does not answer the console call, the ARU in accordance with system parameters attempts to deliver the recorded message a designated number of times and at designated time intervals after the first unsuccessful call attempt until a prescribed retry limit is attained. If the retry limit has not been attained, as indicated by block 479, the ARU operates in accordance with the procedures described above at block 462. Once the re-try limit has been met, the ARU deletes the message, as indicated by block 480, and disconnects from the switching system, as represented by block 450. In instances where the subscriber originating the message has requested delivery verification, the ARU proceeds to complete a call to an automated console in a manner described above in connection with block 484.

Subscriber-Directed Rerouting of Incoming Guest Calls

Figure 13:
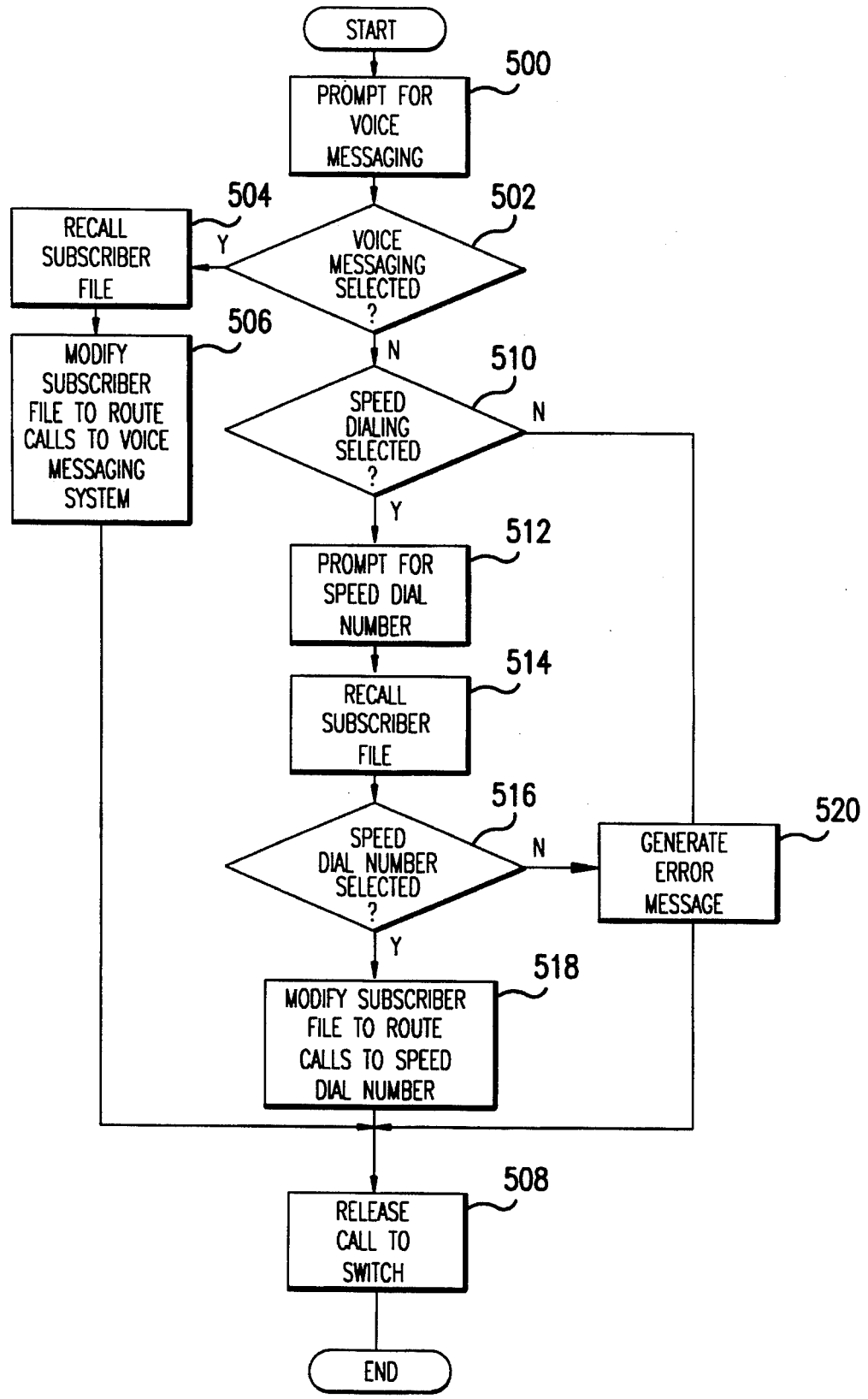
FIG. 13 is a flow chart illustrating the manner in which a subscriber may direct the rerouting of incoming guest calls placed on an access line reserved for the subscriber.

With reference to FIG. 13 there is provided a functional description of the manner in which an automated operator console responds to a subscriber's key-input request to route incoming calls placed on one of the subscriber's personal toll-free telephone numbers to either a forwarding telephone number specified by the subscriber or to the subscriber's personal voice mailbox.

Upon selection of the call redirect subscriber service, which can be implemented by entering a key pad command such as "*8" through the subscriber's telephone station, the automated console handling the subscriber's call generates an audible prompt to query the subscriber as to his desire whether to select the voice messaging service, as indicated by block 500. Selection of the voice messaging service, indicated at block 502, can be implemented by the subscriber depressing one or more appropriate keys of his telephone key pad, the operator console recalls from the file server 52, as noted by block 504, the subscriber's service file and modifies the file so as to provide for appropriate routing of a subscriber's personal incoming calls to the subscriber's voice mailbox, as indicated by block 506. Following call routing to the voice mailbox, the console releases the call to the switching system, indicated at block 508, at which point the console is available to process further calls routed from the switch.

Returning once again to decision block 502, if the outcome of the voice messaging evaluation indicated therein is in the negative, the console monitors the call line to determine whether the subscriber has inputted through his key pad a signal for selection of the speed dialing service, as indicated by decision block 510. If the console receives appropriate signal input from the subscriber indicative of the subscriber's selection of the speed dial service, a prompt is generated by the console, as indicated at block 512, to elicit from the subscriber selection of a specific speed dial number to which incoming calls on the subscriber's toll-free guest number(s) are to be routed. The subscriber file is recalled by the console from the file server, as shown at block 514. As indicated at decision block 516, if the console receives signal input from the subscriber indicative of a specific speed dial number selection, the subscriber file is modified, such as for example modifying the routing number in the subscriber file, to provide for call routing at the switching station of incoming calls to a line corresponding to the designated speed dial number, as indicated by block 518. Following modification of the subscriber file record, the console releases the call to the switching system, indicated at block 508, thereby freeing the console to handle a further call routed thereto from the switching system. In instances where the subscriber has failed, as indicated by either of decision blocks 510 or 516, to select speed dialing or to enter a speed dial number for call re-routing, the console produces an error message, as shown at block 520, after which the call is released in the manner described above with reference to block 508.

Speed Dialing

As noted above, speed dialing is a service by which a system subscriber can command the automated console to dial a predetermined telephone number stored in a speed dial memory location. As with all of the subscriber services described above, speed dialing is accessible from any telephone location capable of accessing the switching system of the subject invention. Preferably, a plurality of speed dialing memory locations are provided for use by each of the enhanced services subscribers.

Figure 14:
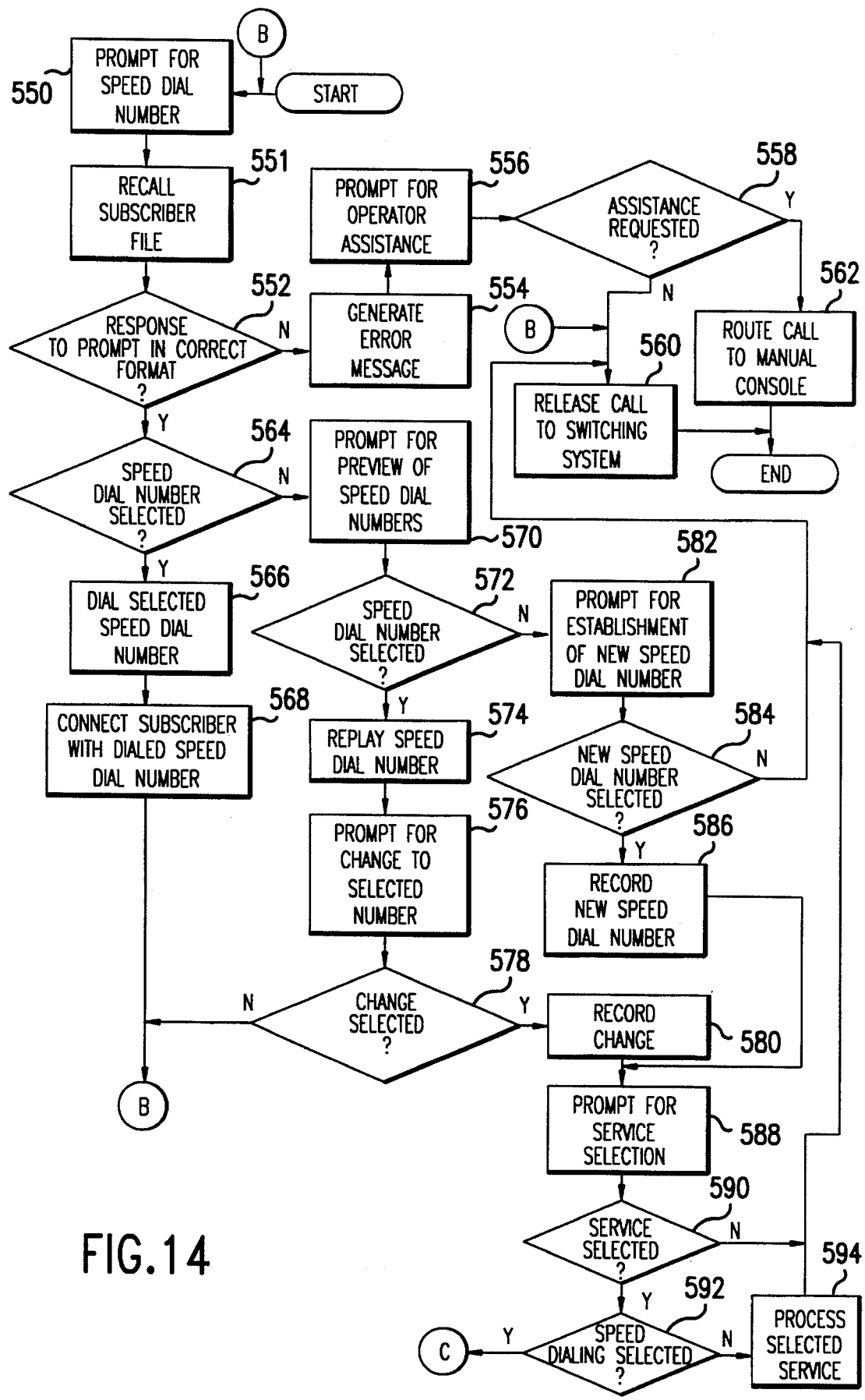
FIG. 14 is a flow chart illustrating the sequence of operations carried out by the long distance switching office of FIG. 2 in order to provide speed dialing services to subscribers.

With reference to FIG. 14, which illustrates in general the logic system by which the speed dialing service is operable from an automated console, initiation of this subscriber service upon key pad entry of an appropriate command to the console directs the console to generate a prompt for selection of a speed dial number, as shown by block 550. The console recalls the subscriber file record from the file server 52 to identify the speed dial numbers recorded therein, as indicated by block 551, and monitors the call line for a subscriber reply. As indicated at block 552, the console evaluates whether the subscribed response to the prompt is in a correct format, i.e., whether or not a speed dial key sequence of the type to which the console control program is arranged to receive has been entered by the subscriber. In the event the subscriber response is in an incorrect format or, for that matter, no response has been received from the subscriber, an error message is generated, as indicated by block 554. Thereafter, the console generates a prompt for operator assistance, as indicated by block 556, and monitors the call line for a subscriber reply, as indicated by decision block 558. If the reply to the operator assistance prompt is in the negative, the console releases the call to the switching system, as noted at block 560, at which point console involvement in the call ceases. However, if the subscriber reply to the operator assistance prompt is in the affirmative, the console routes the call to a manual console for handling thereby, as indicated by block 562. Following call routing to the manual console, automated console handling of the call ceases.

Returning now to the initial decision block 552, if the subscriber's response to the speed dial prompt is in a proper format, i.e., a key sequence entered by the subscriber that is intelligible by the console control program, the control program then further evaluates the subscriber input and determines whether an existing speed dial number included in the subscriber file has been selected, as indicated at decision block 564. If the subscriber input corresponds to an existing speed dial number, the selected speed dial number is dialed, as indicated by block 566, and the console directs the switching system to connect the subscriber's call with the dialed speed dial number, as shown by block 568, after which the console releases the call to the switching system, as noted at block 560. However, if the subscriber's entry at block 564 does not correspond to a speed dial number recorded in the subscriber file, the console generates a prompt to the subscriber for review of the speed dial numbers included in the subscriber file, as shown by block 570, and awaits subscriber input to the call line of a reply to the prompt, as indicated by decision block 572.

Should the subscriber response to the speed dial prompt at block 570 be in the affirmative, the speed console retrieves the selected dial telephone number from the subscriber file and directs the DSP 162 of the console to replay the selected speed dial number, as indicated by block 574. Following replay of the selected speed dial number, the console generates a prompt, indicated at block 576, notifying the subscriber of the availability of incorporating a change to the replayed speed dial number. The console awaits subscriber line reply input, as indicated by decision block 578 and, if the reply is in the negative, the call is released to the switching system, as noted at block 560. However, if the subscriber response to the prompt at block 576 is in the affirmative, the console records the subscriber's change at the designated file memory location, as indicated by block 580.

In the event the subscriber has not inputted through the call line to the console a specific speed dial number for review in response to the review prompt indicated by block 570, a further prompt is generated by the console to notify the subscriber as to his option to create a new speed dial number, as indicated by block 582, and the console awaits subscriber call line reply in response thereto, as indicated by decision block 584. In instances where the subscriber line reply to the prompt 582 is in the negative, the call is released to the switching system in the manner described above in connection with block 560. However, if the subscriber directs reply to the prompt 582 that is in the affirmative, a new speed dial number is recorded at a subscriber-selected memory location, as indicated by block 586. Following entry of the new speed dial number (block 586) or recordation of a change in the telephone number recorded at a specified speed dial location (block 580), the console provides a prompt for a new service selection as shown at block 588, notifying the subscriber of the availability of further services selection. The console then awaits reply by the subscriber, as indicated at decision block 590. If the subscriber's reply indicates no further service is required, the console releases the call in the manner described above in connection with block 560. However, if the subscriber's reply indicates that further service is required, the console then determines in response to subscriber input to the call line, as indicated at decision block 592, whether or not further speed dialing services have been selected. If the service selected by the subscriber is one other than speed dialing, then the selected service is processed in an appropriate manner, as indicated at block 594, and the call is routed to the switching system in the manner described above in connection with block 560. However, if the subscriber has selected further speed dialing services the console generates a prompt for selection of a speed dial number, as described in detail above in connection with block 550. Thereafter, the call is processed in the manner described above until release to the switching system.

Operator Assisted Services

Figure 15A:
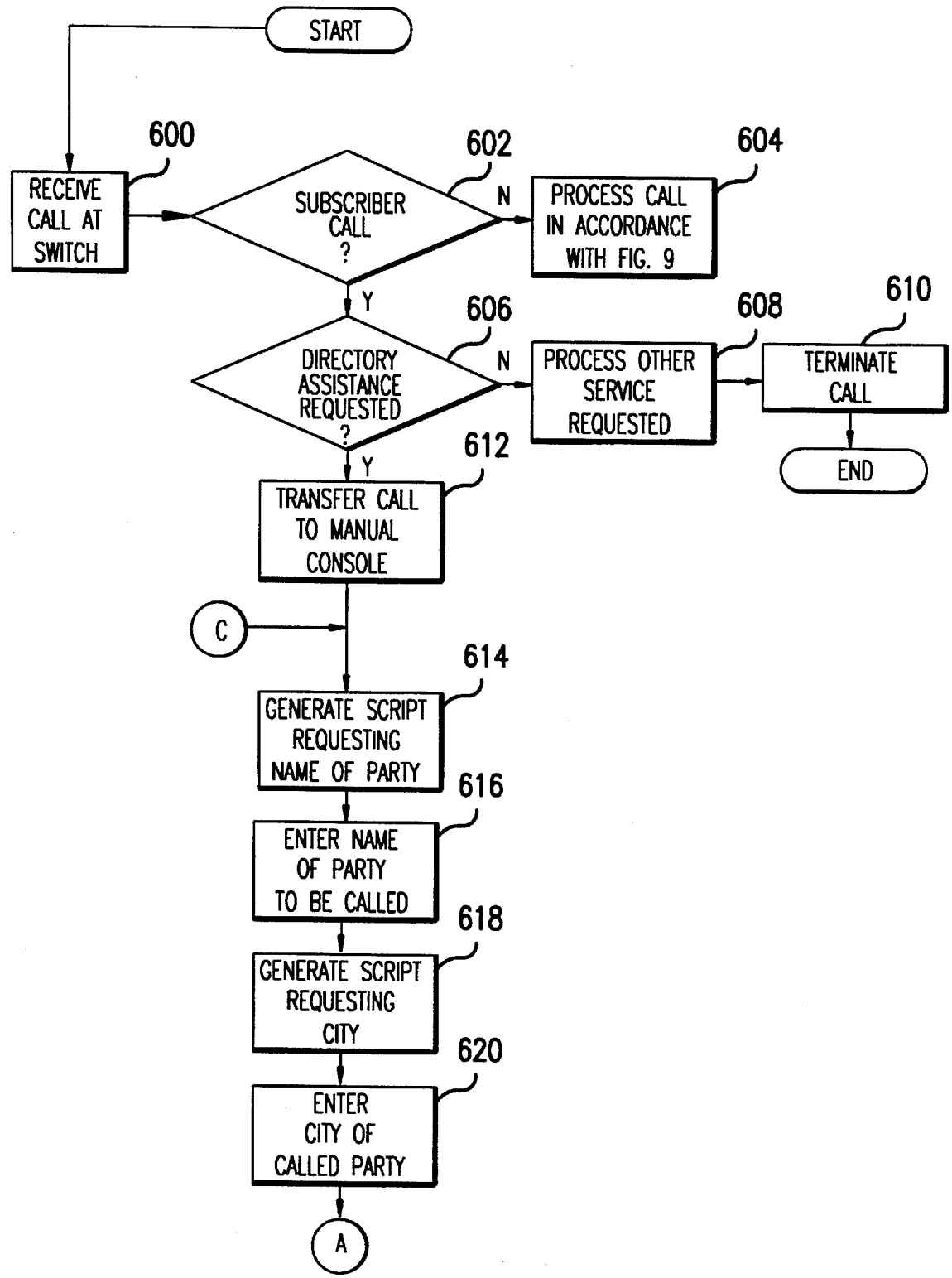
FIG. 15, consisting of FIGS. 15A and 15B, is a flow chart illustrating the manner in which an enhanced directory assistance service is provided to a subscriber from a manual operator console.
Figure 15B:
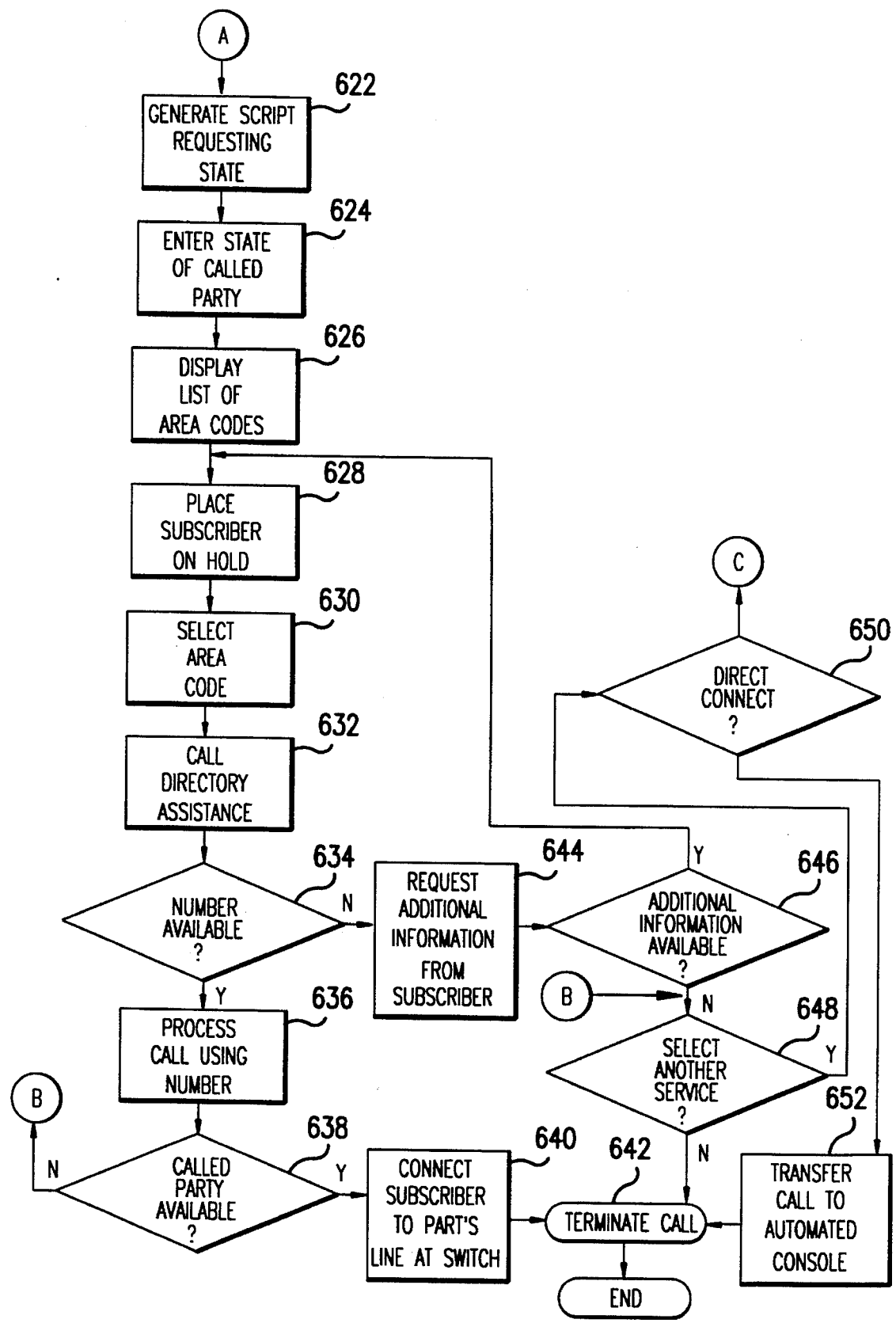

The flow chart set forth in FIG. 15 provides a functional description of the manner in which the long distance facility of the present invention provides subscribers with enhanced directory assistance including direct connection to selected parties using telephone numbers obtained through directory assistance. FIGS. 25(A)–25(D) depict screens that are generated by a manual console to guide the operator through the enhanced directory assistance process.

Following receipt of a call at the switching system 46, as indicated by block 600, the switching system determines in the manner described at FIG. 10 whether the incoming call is that of an enhanced services subscriber or a third party, as shown at block 602. Calls not originated by a subscriber are handled in the manner described above in FIG. 9, as indicated by block 604. Calls originated by a subscriber are evaluated by the switching system to determine whether the directory assistance feature has been selected, as indicated at block 606. Directory assistance is provided by a manual operator console. A subscriber can request directory assistance through a manual operator console by dialing an appropriate command such as "*0" through his telephone key pad after his call has been received at the long distance switch. Alternatively, the subscriber's incoming call can be automatically routed to a manual operator console in the manner described in connection with FIG. 10 above upon his failure to enter a dialed number. If directory assistance has not been selected, the console processes other service requests, as noted at block 608, until the console releases processing control to the switching system, as indicated by block 610.

After the subscriber has requested directory assistance and has been transferred to a manual console, as represented by block 612 (FIG. 24), the manual console is programmed to generate a prompt (FIG. 25A) on the console monitor that instructs the operator to request from the subscriber the name of the call recipient, as indicated by block 614. After the operator has entered the name of a call recipient at the manual console, as indicated by block 616, the console generates another prompt (FIG. 25B) on the monitor which instructs the operator to request from the subscriber the city in which the call recipient is located, as represented by block 618. Once the operator enters the subscriber-requested city (block 620), the console generates a further monitor prompt instructing the operator to request from the subscriber the state in which the call recipient is located, as represented by block 622. As shown in FIG. 25C, the console is programmed to generate a table of state abbreviations from which the operator can choose to facilitate entry of the state requested by the subscriber. Following entry of the call recipient state, as represented by block 624, the console performs a table look-up function in a database using the state entered at block 624 so as to produce on the monitor a table of area codes (FIG. 25D), as indicated by block 626, that correspond to the call recipient state selected by the subscriber. The operator proceeds to place the subscriber on hold at the switching system, as indicated by block 628, and to select an appropriate area code from the list of codes displayed on the monitor in order to place a call to directory assistance for that particular area code by dialing "(area code) 555-1212", as represented by blocks 630 and 632, or a database having similar directory information.

The operator consults with directory assistance personnel in the selected area code to obtain the telephone number of the desired called party. If a telephone number is available, as indicated by block 634, the operator proceeds to dial the called party number as indicated by block 636, and to determine whether the called party is available, as shown at block 638. Following the called party answer to the console call, the operator connects the subscriber through the switching system to the called party line, as indicated by block 640, after which console handling of the call terminates and directory assistance ends, as shown at block 642.

With reference again to decision block 634, if the telephone number of the called party is unavailable through the directory assistance of the selected area code, the operator requests from the subscriber additional information regarding the party to be called, as represented by block 644. Upon receipt of additional information from the subscriber, the operator again places the subscriber on hold and proceeds to contact directory assistance in the selected area code, as represented by blocks 648 and 628. If no further information on the called party is available from the subscriber, the operator prompts the subscriber to select another service, as indicated by block 648. If another service is selected by the subscriber, the operator determines whether or not directory assistance has again been requested by the subscriber, as shown by block 650. If the outcome of this evaluation is that assistance has again been requested, the manual console generates a monitor prompt, as noted at block 614, instructing the operator to request from the subscriber the name of the party to be called, after which the call is further processed in the manner described above. In the event an automated service is requested rather than directory assistance, the subscriber call is transferred to an automatic console, as represented by block 652 and manual operator handling ceases, as indicated by block 642.

Figure 18:
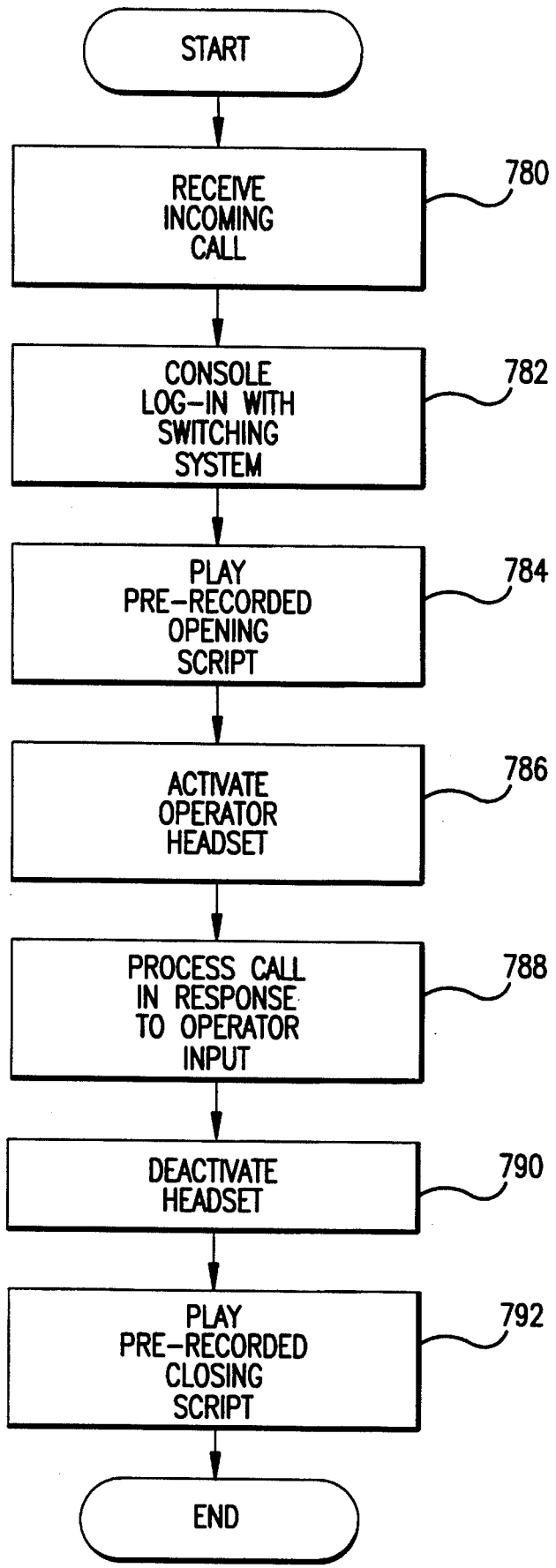
FIG. 18 is a flow chart illustrating the manner in which pre-recorded opening and closing operator scripts may be generated by the manual consoles of FIG. 2.

Pre-recorded audio scripts can be provided as an alternative to the textual manual operator prompts described above in connection with FIGS. 15 and 16A through 16D. The audio scripts can be provided at one or both of the opening and closing stages of an operator-assisted call in order to facilitate operator call processing and to increase the call processing capability of the manual operators. FIG. 18 presents a flow diagram of the manner in which such operator-assisted calls are processed. With reference to the flow diagram, operator-assisted call processing begins upon routing of a call to a manual operator console from an automated console in accordance with an enhanced services subscriber's input through the call line of the operator-assistance service command, as indicated by block 780. Following call receipt, the operator logs on with the switching system 46, as indicated by block 782 by keying in an appropriate identification code. Console log-on in this manner serves the purpose of providing an indication to the switching system that the operator console designated by the identification code is unavailable at that time to process another incoming call. Following log-on, the console plays back to the caller, as indicated by block 784, one or more appropriate pre-recorded audio scripts similar to that depicted in FIG. 16A. The various pre-recorded scripts are typically stored in code form at the file servers 52, and are retrieved by the switching system for use by the console upon entry of the console identification code. The identification code can also be used as a means to identify specific console operators, thereby enabling file server retrieval of pre-recorded scripts that are in the identified operator's own voice. The pre-recorded scripts can be of a type which provide only a caller greeting or that, in addition, elicit caller repsonse in either spoken or demonstrative (i.e., depressing a specific key pad) responses. During the period of script play-back to the caller, the headset microphone of the operator is preferably inactive in order that the caller is not disturbed by any background sounds that could be picked up through the operator's microphone. Once the opening script has been played to completion, the headset microphone is actuated, as shown at block 786, in order that the operator may converse directly with the caller to further process the call, as is indicated by block 788. Upon entry of an appropriate keyboard or similar command at a subsequent point of operator call processing, such as at the closing of operator handling, the operator microphone is deactivated, as denoted by block 790, and an appropriate prerecorded closing script is played to the caller, as shown at block 792. In view of the foregoing description, it will be appreciated that prerecorded scripts can be played at various times during the course of operator call processing and that prerecorded scripts in a variety of foreign languages can be played to a caller upon selection of appropriate operator console inputs.

Third Party Guest Access

The telephone system of the subject invention provides a scheme by which non-subscribers (i.e., guests) can access and utilize particular features of the telephone system. Guest access to the switching system can be obtained by dialing a toll-free guest number that has been assigned to a system subscriber. As mentioned previously, system subscribers can obtain one or more toll-free guest numbers in accordance with their own perceived needs. It is envisioned that the system subscriber will provide an appropriate one of his personal toll-free telephone numbers to persons having a need to either reach the subscriber at a forwarded telephone location or to record a message for subscriber playback.

Figure 17:
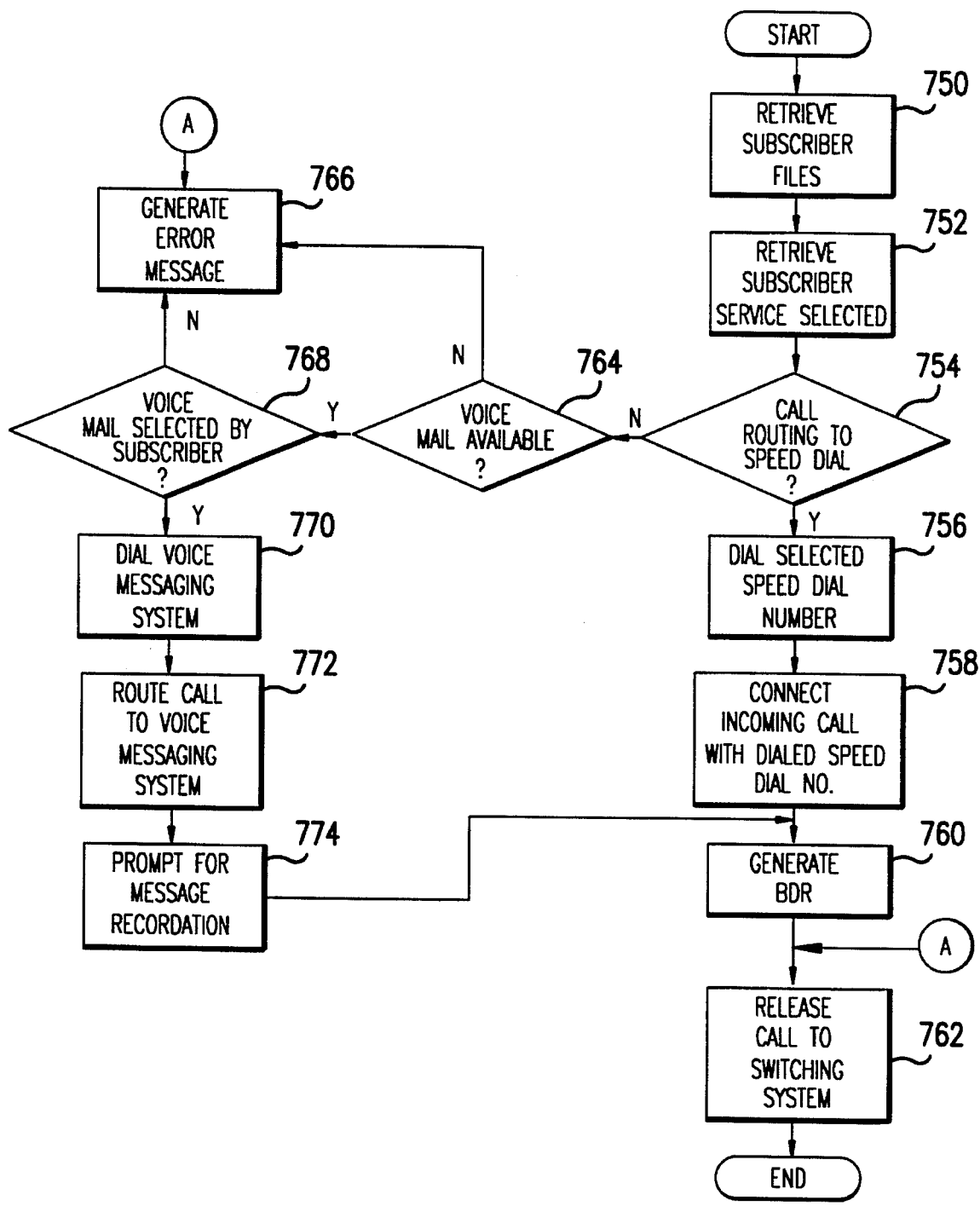
FIG. 17 is a flow chart illustrating the manner in which guest calls to subscribers are handled by the long distance switching office of FIG. 2.

With reference to FIG. 17, toll-free subscriber guest numbers dialed by a user are received by an automated console which, upon receipt thereof, retrieves subscriber file data from the file servers 52, as indicated at block 750, and accesses the customer 800 fields thereof to identify the subscriber to whom the call is both attributable and chargeable. Upon console retrieval of the subscriber file, the file is further evaluated by the console to determine which guest service has been selected by the subscriber, as indicated by block 752. As indicated by decision block 754, the subscriber file is evaluated by the console to ascertain whether an entry exists in the file for a field corresponding to the selection of guest call re-routing. If the console identifies this field as having been selected by the subscriber, the console accesses the corresponding speed dial field and directs the switching system to dial the speed dial number from the designated file field, as indicated by block 756, and to connect the guest call therewith, as denoted by block 758. Following call connection in the foregoing manner, a BDR is generated, as shown at block 760, and the console releases the call to the switching system, as shown at block 762, for handling of another call to be routed from the switching system.

With reference once again to decision block 754, if the console does not identify the presence of a guest call re-routing field in the subscriber file, the console evaluates the subscriber file further to ascertain whether there exists in the file a field corresponding to the availability of the voice messaging service, as indicated at decision block 764. In the event that the console cannot identify this file field, the console generates an error message to the guest caller, indicated by block 766, and thereafter releases the call to the switching system, denoted at block 762.

Console identification of the voice messaging file field results in a further console evaluation, indicated by decision block 768, as to whether the voice messaging service is designated in the file field as having been selected by the subscriber. In the event this service has not been selected, an error message is generated in the manner noted above with respect to block 766 and the call is thereafter released to the switching system. However, if the console identifies from the subscriber file that the voice messaging service has been selected, the console dials the voice mailbox 47 of the messaging system, as indicated by block 770, with the appropriate route number identified in the subscriber file and routes the guest call thereto, as shown by block 772. Upon connection with the guest call, the console prompts the guest caller to record a message for the subscriber, as noted at block 774 after which the console produces a BDR for billing purposes in the manner described above in connection with block 760. Following BDR generation, the call is passed from the console to the switching system, as indicated by block 762.

Enhanced Conference Calling Service

Figure 19:
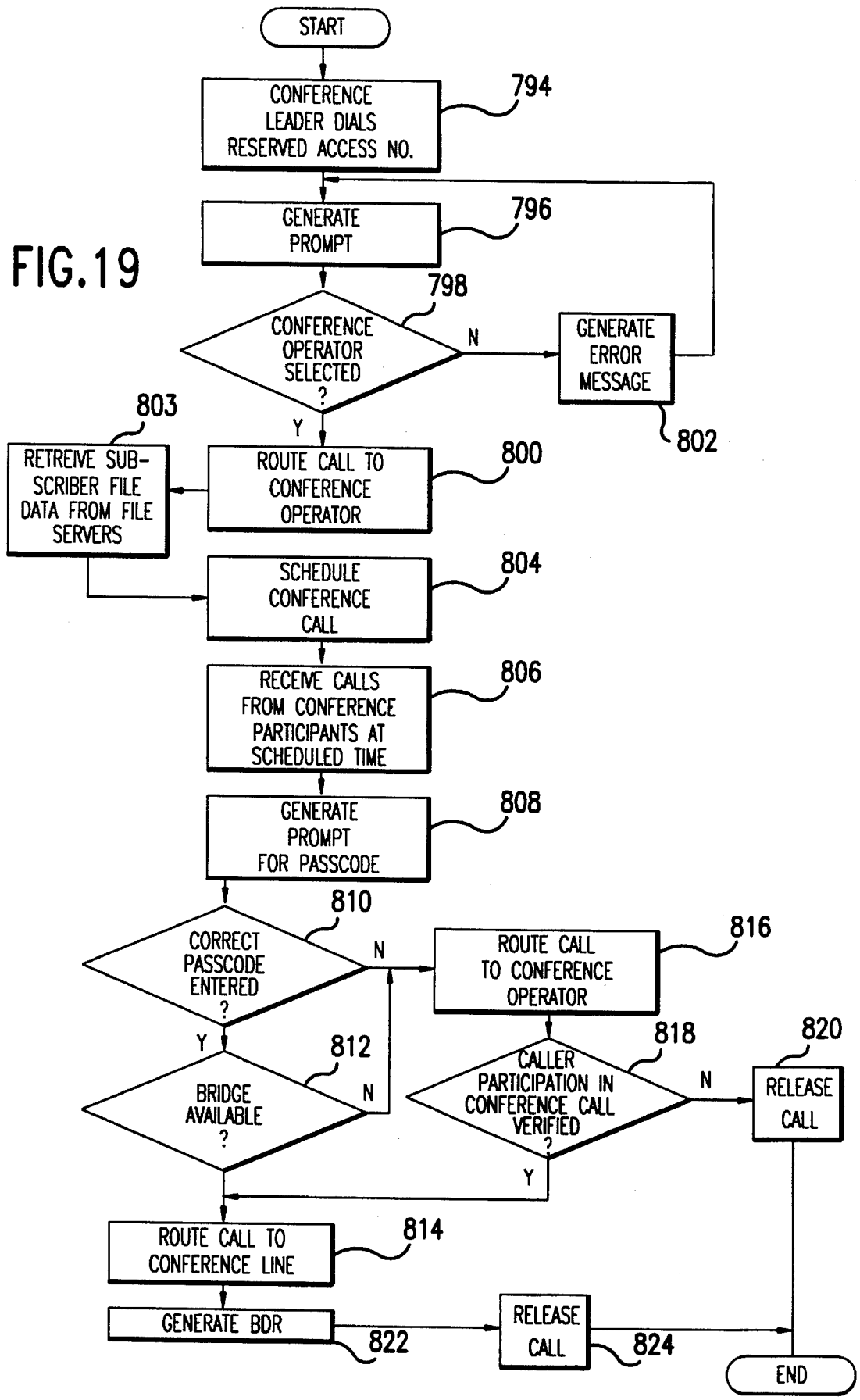
FIG. 19 is a flow chart illustrating the manner in which an enhanced conference calling service may be provided in accordance with the present invention.

Details of an enhanced conference calling service that is provided in accordance with the present invention are described below in connection with the flow chart depicted in FIG. 19. With reference to the drawing, scheduling of the enhanced conference call service is initiated upon dialing a conference call scheduling number as indicated by block 794. Preferably, each enhanced conference calling subscriber is provided with an access number, such as a toll-free number, that is unique to that particular subscriber. Upon receipt of the dialed number, the switching system 46 generates an audible prompt, as indicated by block 796, thereby informing the caller of the need for a reply. Upon receipt of an appropriate reply, which may consist of depressing the "0" key of the caller's telephone key pad, as indicated by decision block 798, the subscriber is routed to a conference call operator, as indicated by block 800. Preferably, dedicated conference call operators are provided to receive incoming conference scheduling calls, in order to facilitate call processing. In the event that the subscriber fails to provide the proper reply to the prompt, as indicated by block 796, an appropriate error message is produced, as indicated by block 802. Subsequently, the prompt indicated at block 796 is produced once again.

Following call routing to the conference operator in the manner described above, subscriber file data is retrieved from the file servers 52, as shown by block 803, and the conference operator collects from the subscriber the subscriber's conference call pass code and matches this code with the pass code recorded in the subscriber file. Following pass code verification, the conference operator receives call scheduling information from the subscriber as indicated by block 804. This scheduling information includes the date and time of the desired conference call, the telephone numbers of the call participants, the call pass code, the conference call access number, and (optionally) the expected maximum duration of the call. After the scheduling operator has received this information, the appropriate date and time is reserved for use of the conference bridge 51 of FIG. 2. The conference bridge 51 may be of a commercially available type, such as the Model MBX unit manufactured by Confertech International of Golden, Colo.

When the scheduled date and time for the conference call arrives, incoming calls from the third party conference participants are received at the long distance switching office 46, as indicated by block 806. Each third party participant receives an audible prompt, as shown by block 808, for entry of the pass code that has been assigned for authorized connection to the conference call line. The switching system awaits entry of the pass code, as indicated by decision block 810. Upon entry of the proper pass code, the switching system accesses the conference bridge to ascertain its availability, as indicated by block 812. If the conference bridge is determined to be available, the caller is routed to the conference call line through the conference call bridge as shown by block 814.

With reference again to decision blocks 810 (pass code) and 812 (conference bridge), if the outcome of either evaluation is in the negative (i.e., due to entry of an improper pass code or unavailability of the conference bridge), the call is routed to a manual operator console, as indicated at block 816. The console attendant is provided with subscriber file data relating to the establishment of the conference call based on the caller's dialed number input and can proceed to assist the caller and ascertain whether the caller is entitled to participate in the conference call, as shown by decision block 818. If the console attendant determines on the basis of the information provided by the caller that the caller is not entitled to participate in the conference call, the call is released, as shown by block 820, after which operator involvement in the call ceases. However, if the caller provides the proper information, such as the date and time of the conference call and the conference call pass code, the operator routes the call through the conference bridge to the conference line, as indicated at block 814. Following call routing to the conference line, the operator console generates a BDR for that conference call participant, as denoted by block 822. The conference call operator then releases the call, as shown by block 824, and operator participation in the call ceases. A BDR is recorded for each conference call participant and is correlated by the management information system (MIS) 58 with CDR data and the subscriber file record data in the manner described below to provide a billing statement for the cumulative cost of the conference call.

Account statement Production

Figure 20:
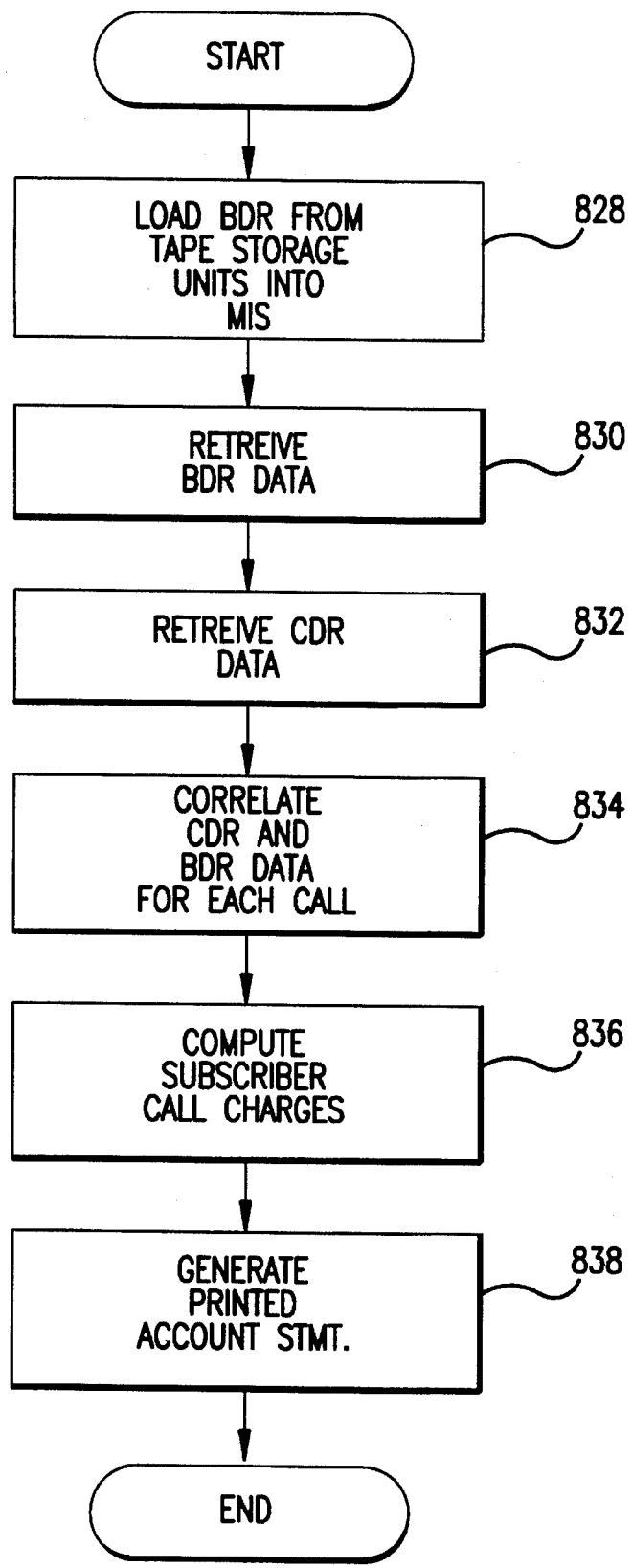
FIG. 20 is a flow chart illustrating the sequence of operations carried out by the management information system of FIG. 2 in generating a bill for the subscriber.

Operation of the management information system (MIS) 58 for the determination of call charges is illustrated generally in the flow chart depicted in FIG. 20. With reference to the flow chart, BDR information stored on magnetic tape is obtained from the storage units 56, as shown by block 828, and is input to the MIS 58 by conventional magnetic tape drive systems. Thereafter, BDR data is retrieved from the tape (block 830). CDR data produced by the digital switching system 46 is received therefrom following completion of a toll call routed through the switching system, as shown by block 832. Following receipt of CDR and BDR data, the CPU 118 processes the data for each call in accordance with billing program control accessed from ROM 120, as indicated by block 834, by correlating data contained in the ACI field of the CDR with data from corresponding fields contained in the BDR. Matching of CDR and BDR records is confirmed upon CPU verification that the contents of the dialed number information for each of the correlated CDR and BDR records contains the same information. Once the corresponding CDR and BDR records are matched together, the MIS determines the charges for the call, as noted by block 836. Call charges are typically based upon such factors as call duration, day of the week on which the call was originated, time of call origination, the locations of both the caller and the dialed telephone station, and the nature of any enhance services utilized by the subscriber. Further charge factors that can be considered include access fees for local telephone line operating companies, as well as the type of line utilized for the call (e.g., data, international). Following call charge determination, the CPU instructs the printer 126 in accordance with pre-programmed or operator input commands to generate a printed copy of an account statement of the call, as shown at block 838. Information such as the subscriber's name and billing address can be accessed by the MIS 58, if necessary, for inclusion in an appropriate field of the account statement. Once printed, the statements can be delivered to the respective subscribers for account reconciliation. It is to be noted, however, that not all subscribers will require a printed account statement. Such subscribers can typically include hotels and other lodging establishments, which provide telephone service to guests whose stay at the establishment is generally of a short duration. In such instances, provisions can be made for modem or other form of electronic delivery of the account information in order that the parties placing the calls can be appropriately billed prior to their departure.

What is claimed is:

1. A telephone switching system for use with a long distance telephone network and adapted to provide subscriber-directed rerouting of incoming calls, comprising:

call switching means for receiving and recognizing subscriber calls on a first incoming line accessible by a subscriber from any telephone in communications with said long distance telephone network and receiving calls intended for said subscriber on a second incoming line reserved for said subscriber, said second line also being accessible by any telephone in communications with said long distance telephone network;

call processing means coupled to said call switching means; and storage means coupled to said call processing means for storing a subscriber file containing at least one routing number indicative of a telephone line accessible by said network or a telephone number to which calls for said subscriber are to be rerouted;

said call processing means being operative to retrieve said subscriber file from said storage means when an incoming call is received on said second incoming line, and to cause said call switching means to complete the call using only said one routing number contained in said subscriber file without reference to other files and without requiring further information from a calling party associated with the call;

said call processing means further being operative to retrieve said subscriber file from said storage means and to modify said routing number in response to at least one request code entered by said subscriber on said first incoming line.

2. A telephone switching system as claimed in claim 1, wherein said routing number is either a telephone number indicative of said telephone line accessible by the network to which calls for the subscriber are to be routed or said telephone number which directs incoming calls to a voice messaging system accessible by said subscriber, depending on said one request code entered by the subscriber.

3. A telephone switching system as claimed in claim 1, wherein said one routing number comprises a speed dial number stored in said storage means.

4. For use in conjunction with a long distance telephone network, a method for allowing a subscriber to direct rerouting of incoming calls received at a telephone switching system, comprising the steps of:

receiving and recognizing a call from said subscriber as a subscriber call on a first incoming line which is accessible by any telephone in communications with said long distance telephone network;

receiving from said any telephone a request code entered by said subscriber, said request code designating at least one routing number indicative of a telephone line accessible by said long distance telephone network to which incoming calls for said subscriber are to be rerouted;

storing said routing number in a subscriber file;

retrieving said subscriber file when an incoming call is received on a second incoming line reserved for said subscriber; and completing the incoming call using only said one routing number contained in said subscriber file without reference to another file and without requiring further information from a calling party associated with the call.

5. A method as claimed in claim 4, wherein said first incoming line is shared by a plurality of subscribers, and wherein the step of receiving a subscriber call on said first incoming line includes the step of receiving an authorization code identifying said subscriber.

6. A method as claimed in claim 4, wherein said routing number directs incoming guest calls to a voice messaging system accessible by said subscriber.

7. A method as claimed in claim 4, wherein said one routing number comprises a speed dial number.

8. A telephone switching system as claimed in claim 1 wherein the call processing means is further operative to release an incoming call back to said call switching means following call completion so that said call processing means becomes available for completing other incoming calls.

* * * * *